United States Patent
Yoshikawa

(10) Patent No.: US 7,076,673 B2
(45) Date of Patent: Jul. 11, 2006

(54) POWER SAVING MANAGEMENT SYSTEM AND POWER SAVING MANAGING METHOD FOR FORWARDING AN UPDATED POWER MODE SHIFT TIME TO A PLURALITY OF OUTPUT APPARATUSES OVER A NETWORK

(75) Inventor: Tomoyasu Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 10/368,669

(22) Filed: Feb. 20, 2003

(65) Prior Publication Data

US 2003/0163747 A1    Aug. 28, 2003

(30) Foreign Application Priority Data

Feb. 26, 2002    (JP)    ............................. 2002-050387

(51) Int. Cl.
*G06F 1/26*    (2006.01)
(52) U.S. Cl. .................. 713/300; 713/310; 700/296; 399/88
(58) Field of Classification Search ..................... None
See application file for complete search history.

(56) References Cited

U.S. PATENT DOCUMENTS

| | | | |
|---|---|---|---|
| 5,710,959 A * | 1/1998 | Hirooka et al. ............... | 399/88 |
| 5,815,652 A * | 9/1998 | Ote et al. ..................... | 714/31 |
| 6,144,975 A * | 11/2000 | Harris et al. ................. | 715/500 |
| 6,408,395 B1 * | 6/2002 | Sugahara et al. ........... | 713/310 |
| 6,631,469 B1 * | 10/2003 | Silvester ........................ | 713/2 |
| 6,751,219 B1 * | 6/2004 | Lipp et al. ................... | 370/390 |

FOREIGN PATENT DOCUMENTS

| | | |
|---|---|---|
| JP | 2000-94794 | 4/2000 |
| JP | 2001-66951 | 3/2001 |

* cited by examiner

*Primary Examiner*—Lynne H. Browne
*Assistant Examiner*—Anand B. Patel
(74) *Attorney, Agent, or Firm*—Fitzpatrick, Cella, Harper & Scinto

(57) ABSTRACT

A managing apparatus has a RAM for storing power saving mode shift time and notifies output apparatuses of the stored power saving mode shift time via a network. Each output apparatus is shifted to a power saving mode when measured time by a built-in timer reaches the notified power saving mode shift time.

14 Claims, 20 Drawing Sheets

POWER SAVING MANAGEMENT SYSTEM AND POWER SAVING MANAGING METHOD FOR FORWARDING AN UPDATED POWER MODE SHIFT TIME TO A PLURALITY OF OUTPUT APPARATUSES OVER A NETWORK

BACKGROUND OF THE INVENTION

1. Field of the Invention

The invention relates to a power saving management system and, more particularly, to a power saving management system which can reduce the whole electric power consumption of the output apparatuses in a printer processing system in an environment such that the output apparatuses such as a plurality of copying apparatuses, printers, facsimiles, and the like and a workstation, a personal computer, an information terminal, and the like which are used by the user are connected to a network.

2. Related Background Art

In recent years, a computer network (hereinafter, simply referred to as a network) in which various computers and their peripheral equipment are connected so that information can be bidirectionally communicated has been established. Such a computer network is a technique which is drawing much attention because productivity and efficiency can be remarkably improved by a method whereby a plurality of users share information and a burden of information processes is distributed on the network.

The reasons for such improvement are as follows: even a computer for personal use can be easily used as advanced and high-speed information processing means owing to the rapid realization of excellent performance, miniaturization, and reduction in costs of the computers; a wired or wireless data communicating technique of a high speed has been developed; an idea of a distributed processing architecture has been spread; and the like.

Further, an idea such that output apparatuses such as copying apparatuses, printers, and the like which have, so far, been used so far as stand-alone peripheral equipment or as peripheral equipment connected to one host computer in most cases are also arranged onto the same network and shared by a plurality of users (clients) has been widespread.

A main frame, a workstation, a personal computer, an information terminal, and the like using the foregoing computer are connected by the network and information accumulated in a file, a database, or the like can be shared. By also connecting the copying apparatuses, printers, facsimile apparatuses, and the like serving as output apparatuses, they can be also shared. The productivity and efficiency of the output apparatuses and the use convenience of the users can be remarkably improved.

As mentioned above, an advantage which is obtained by establishing the network is large and such a network system is being spread in various fields such as offices, factories, research institutes, educational institutions, and the like.

SUMMARY OF THE INVENTION

In the output apparatus such as copying apparatus, printer, or the like, when an image forming request is made by the user, many processing steps for forming an image are necessary to meet such a request. To execute those processing steps, the output apparatus is constructed by an image reading unit, an image processing unit, a paper feeding unit, a developing unit, a transfer unit, a fixing unit, a paper ejecting unit, other accessories, and a control unit for integratedly controlling those apparatuses. To output the image, it is necessary to supply a large electric power to each apparatus in the output apparatus.

In order to allow the output apparatus to promptly respond to an image outputting request from the user, an electric power of a certain extent has to be continuously supplied to each apparatus in the output apparatus. However, a use environment of the output apparatus such that the image outputting request is made at a high frequency all the time is rare. Generally, there are a time zone when the number of image outputting requests from the users to the output apparatus decreases largely and a time zone when the image outputting request is hardly made.

In the case where the image outputting request to the output apparatus is not made for a long time, the electric power supplied meanwhile to each apparatus in the output apparatus is vainly consumed.

Therefore, as an output apparatus such as copying apparatus, printer, or the like, there has already been proposed a printing apparatus which intends to largely reduce the electric power consumption by constructing in a manner such that a control apparatus provided in the apparatus has time measuring means such as a first timer device or the like, the timer device is activated by the operation of the user, and when time measured by the timer device is equal to time which has also been preset by the user, the control unit of the printer shuts off the power supply to each apparatus except for the necessary minimum power supply.

By using the above construction, the output apparatus is shifted to a sleep mode in the time zone when the number of image outputting requests decreases largely and in the time zone when the image outputting request is hardly made, so that the reduction of the electric power consumption of the output apparatus can be expected.

However, in the environment such that a plurality of output apparatuses including the timer devices are used as mentioned above, hitherto, the user needs to go to each output apparatus and execute the setting operation of the timer device, so that such a construction is not necessarily good in view of the use convenience of the user.

Similarly, it is probable that the users execute the different setting operations to the timer devices of the output apparatuses. When considering the reduction of the electric power consumption in the whole environment where the output apparatuses are installed, its reduction efficiency is low.

Further, a situation such that the user carelessly forgets to set the timer device can be considered enough. Such a case also becomes a large factor of obstruction to the reduction of the electric power consumption.

It is, therefore, an object of the invention to provide a power saving management system which can solve the problem as mentioned above.

DETAILED DESCRIPTION OF THE PREFERRED EMBODIMENTS

An embodiment of the invention will be specifically explained hereinbelow with reference to the drawings.

EMBODIMENT 1

Figure 1:
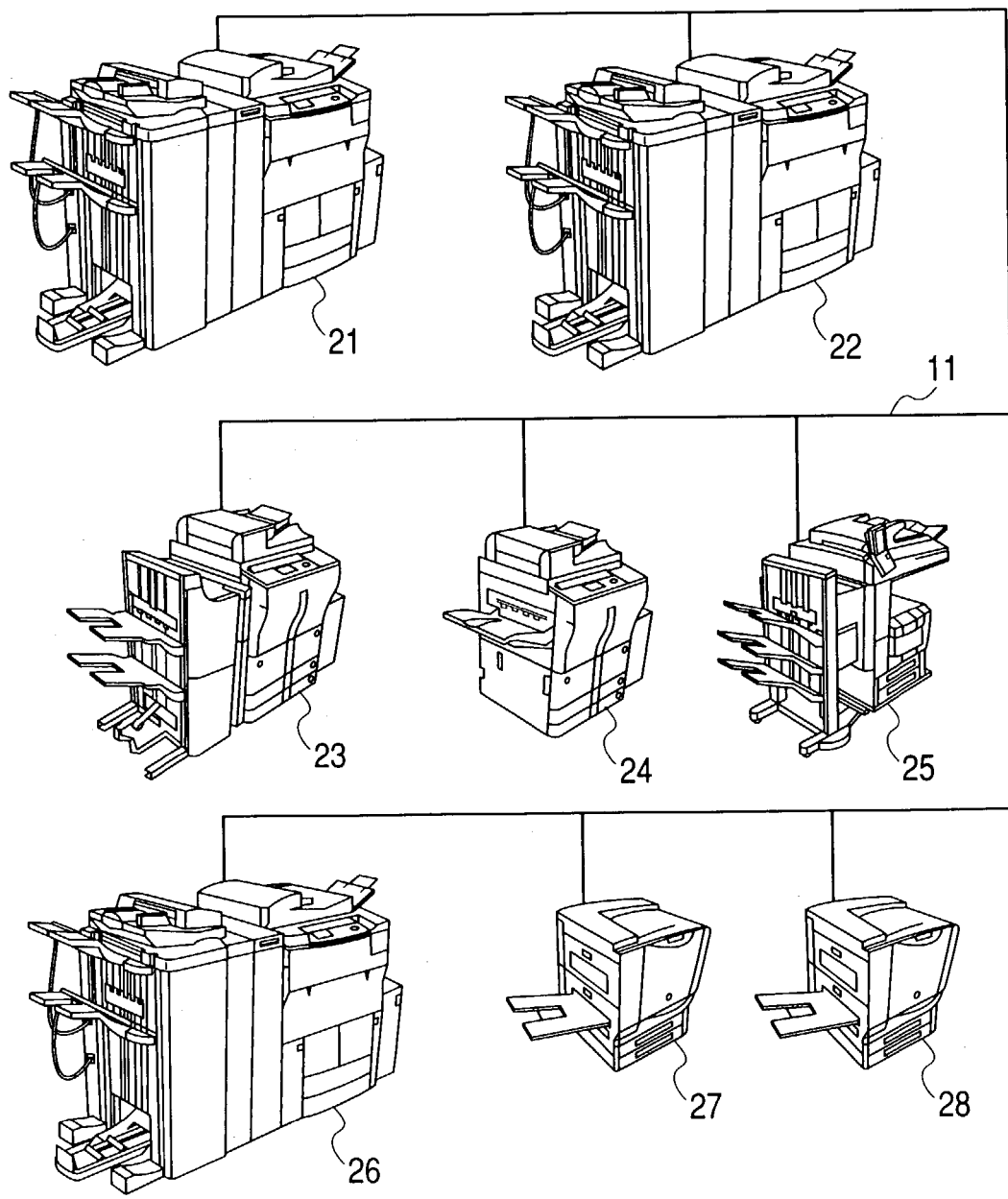
FIG. 1 is a diagram showing an example of a schematic construction of a network system to which the invention is embodied.

FIG. 1 is a diagram showing a schematic construction of a network system to which the invention is embodied.

Reference numeral 11 denotes a network which mutually connects output apparatuses 21 to 28 and functions as a transfer medium of information. Although not shown, a computer, a workstation, a terminal apparatus, and the like are also connected to the network 11. Network services such as sharing of the information, distributed processes, and the like are provided to the users.

Reference numerals 21 to 28 denote the output apparatuses connected to the network. Generally, the output apparatuses function as printers. The output apparatuses 21 to 28 receive image outputting requests from the computer and workstation (not shown) serving as clients and generate image data transferred via the network.

Each of the output apparatuses 21 to 26 has a construction such that the output apparatus itself also has an image reading apparatus, and a function as a copying apparatus such that the image data read by the output apparatus itself can be outputted by the self output apparatus can be provided to the users.

Figure 10:
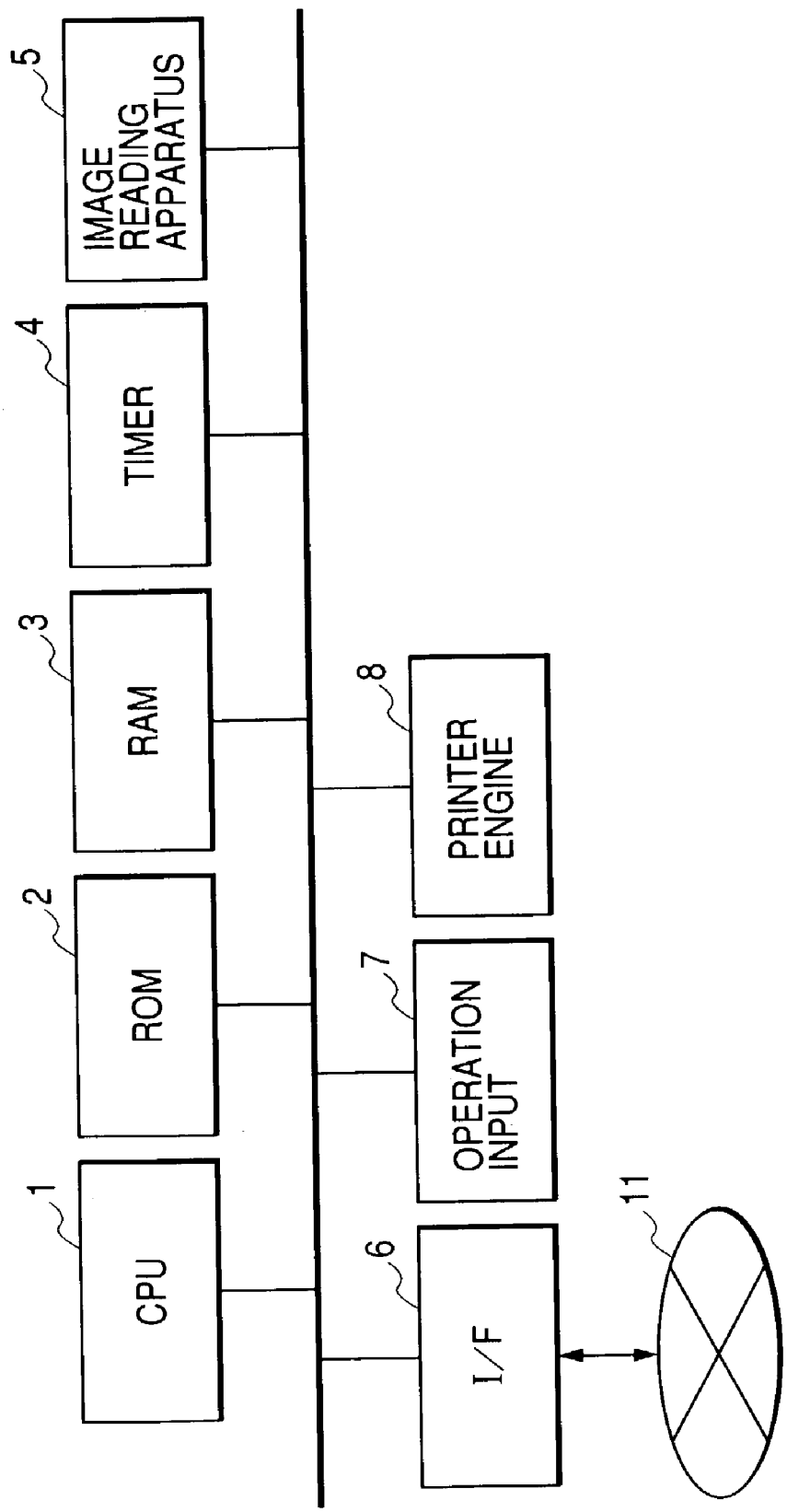
FIG. 10 is a block diagram showing a construction of the output apparatus.

A construction (mainly, a control unit) regarding the invention in such an output apparatus will now be described with reference to FIG. 10 (each of the following embodiments has a similar construction). In FIG. 10, reference numeral 1 denotes a CPU for controlling the operation of the whole output apparatus; 2 a ROM in which a control procedure of the CPU 1 has been stored; 3 a RAM which provides a work area (including each data area, which will be explained hereinlater) of the CPU 1; 4 a timer (timer device) (one or a plurality of timers) serving as time measuring means; 5 an image reading apparatus (excluding the output apparatuses 27 and 28); 6 an interface for controlling transmission and reception of data between the network 11 and the output apparatuses; 7 an operation input unit which includes an operation unit having display means shown in FIG. 5 and the like and executes various operation inputs, which will be explained hereinlater, from the users; and 8 a printer engine for outputting an image onto recording paper in accordance with supplied data.

The timer device is activated by the operation of the user. When time measured by the timer device is equal to time which has been preset by the user, the control unit of the printer shuts off the power supply to each apparatus except for the necessary minimum power supply, so that the electric power consumption can be remarkably reduced.

In the conventional construction, to set the timer device of each of the output apparatuses 21 to 28, the user has to go to each output apparatus to be set and execute the setting operation of the timer device, so that it is not efficient for the user.

In the invention, however, power saving mode shift time information data of one output apparatus operated by the user among the output apparatuses 21 to 28 is transferred to other output apparatuses 21 to 28 via the network. Details of such a construction will be described hereinbelow.

Figure 2:
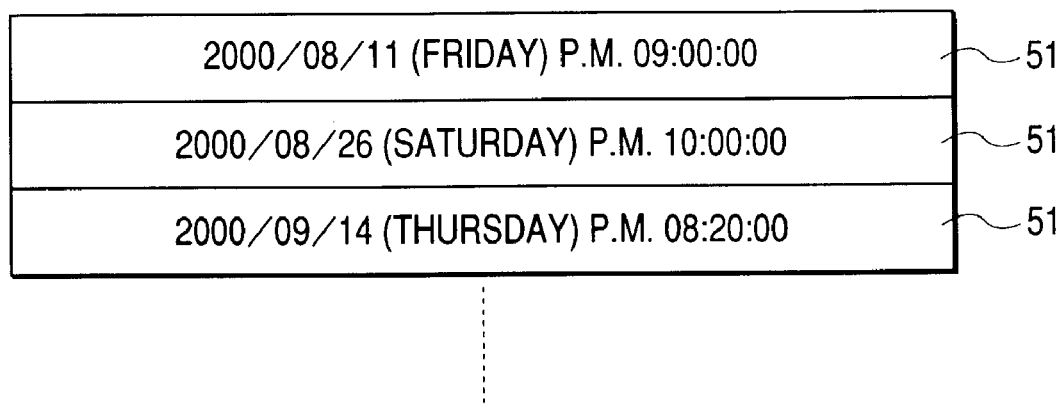
FIG. 2 is a diagram showing an example of a format of power saving mode shift time information data.

FIG. 2 is a diagram showing an example of a format of the power saving mode shift time information data built in the memory means (RAM 3) of the output apparatuses 21 to 28.

Reference numeral 51 denotes records in which the power saving mode shift time information data has been stored.

As shown in the diagram, time/date information indicative of time and date when an operating mode of the printer is shifted to a power saving mode has been recorded in each record 51. In each of the output apparatuses 21 to 28, when the time/date information stored in the record 51 built in each output apparatus coincides with a value of the timer 4 likewise built in each output apparatus, this output apparatus is shifted to the power saving mode.

Figure 3:
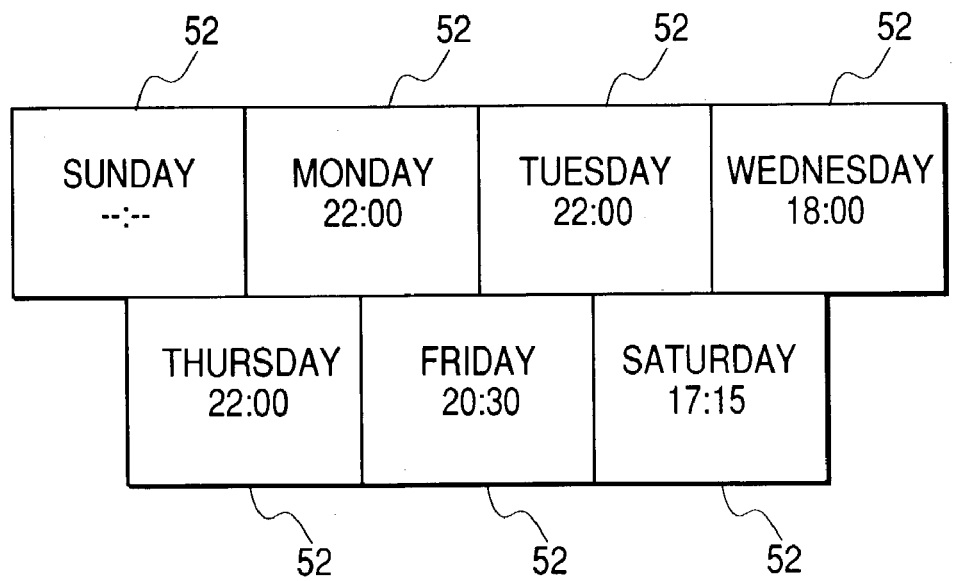
FIG. 3 is a diagram showing an example of a format of the power saving mode shift time information data in a week unit.

FIG. 3 is a diagram showing an example of a format of the power saving mode shift time information data in a week unit built in the RAM 3 of the output apparatuses 21 to 28. Reference numeral 52 denotes records in which the power saving mode shift time information data in a week unit has been stored.

As shown in the diagram, time/date information indicative of time and date when the operating mode of the printer is shifted to the power saving mode has been recorded in each record 52 on a week unit basis. In each of the output apparatuses 21 to 28, when the time/date information stored in the record 52 built in each output apparatus coincides with a value of the timer likewise built in each output apparatus, this output apparatus is shifted to the power saving mode.

Unlike the power saving mode shift time information data described in FIG. 2, the shift time when the printer is shifted to the power saving mode can be set on a week unit basis, so that the higher use convenience of the user is obtained.

Figure 4:
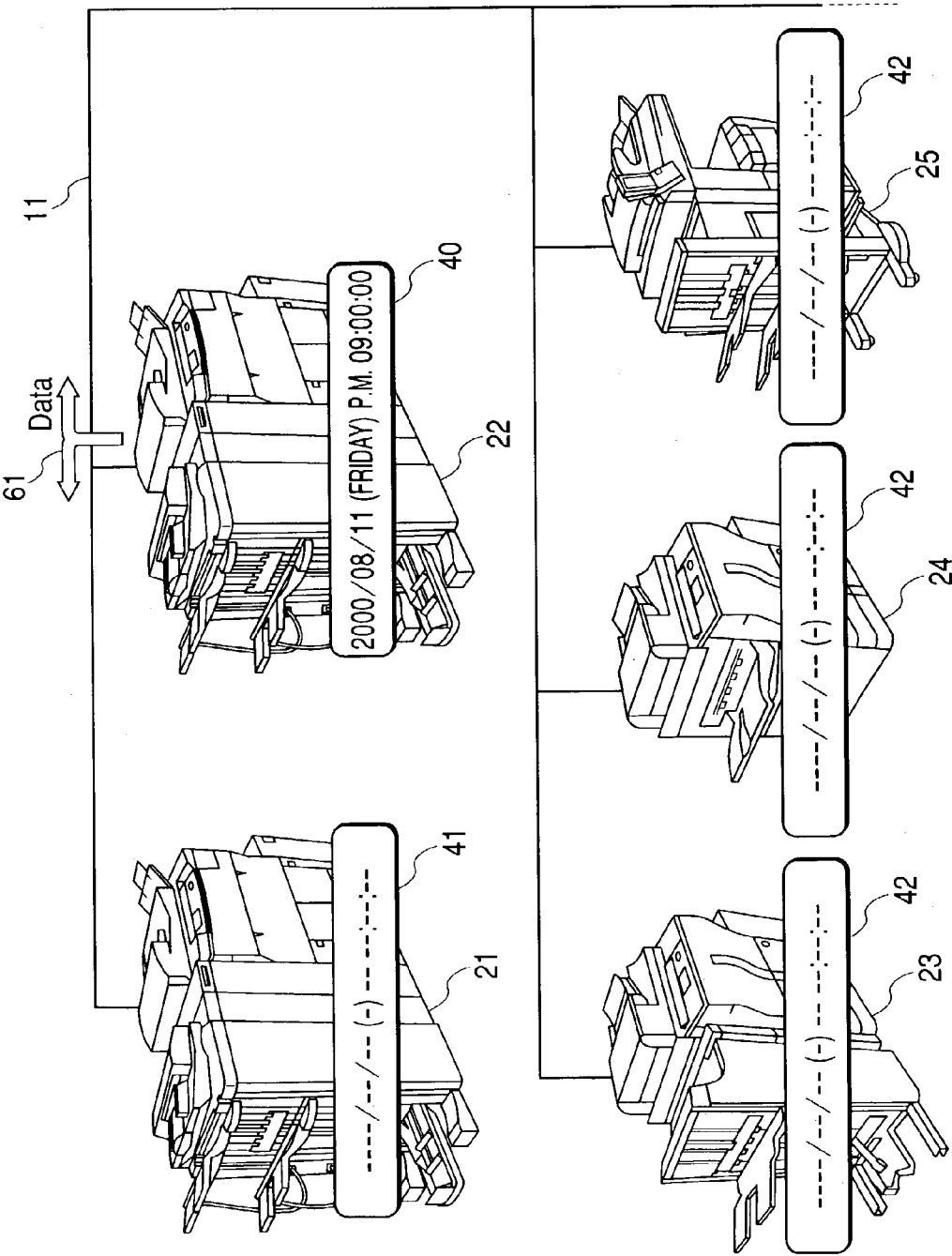
FIG. 4 is a diagram showing a state where the power saving mode shift time information data is transmitted from a first output apparatus 22 to each of second output apparatuses 21 and 23 to 28.
Figure 5:
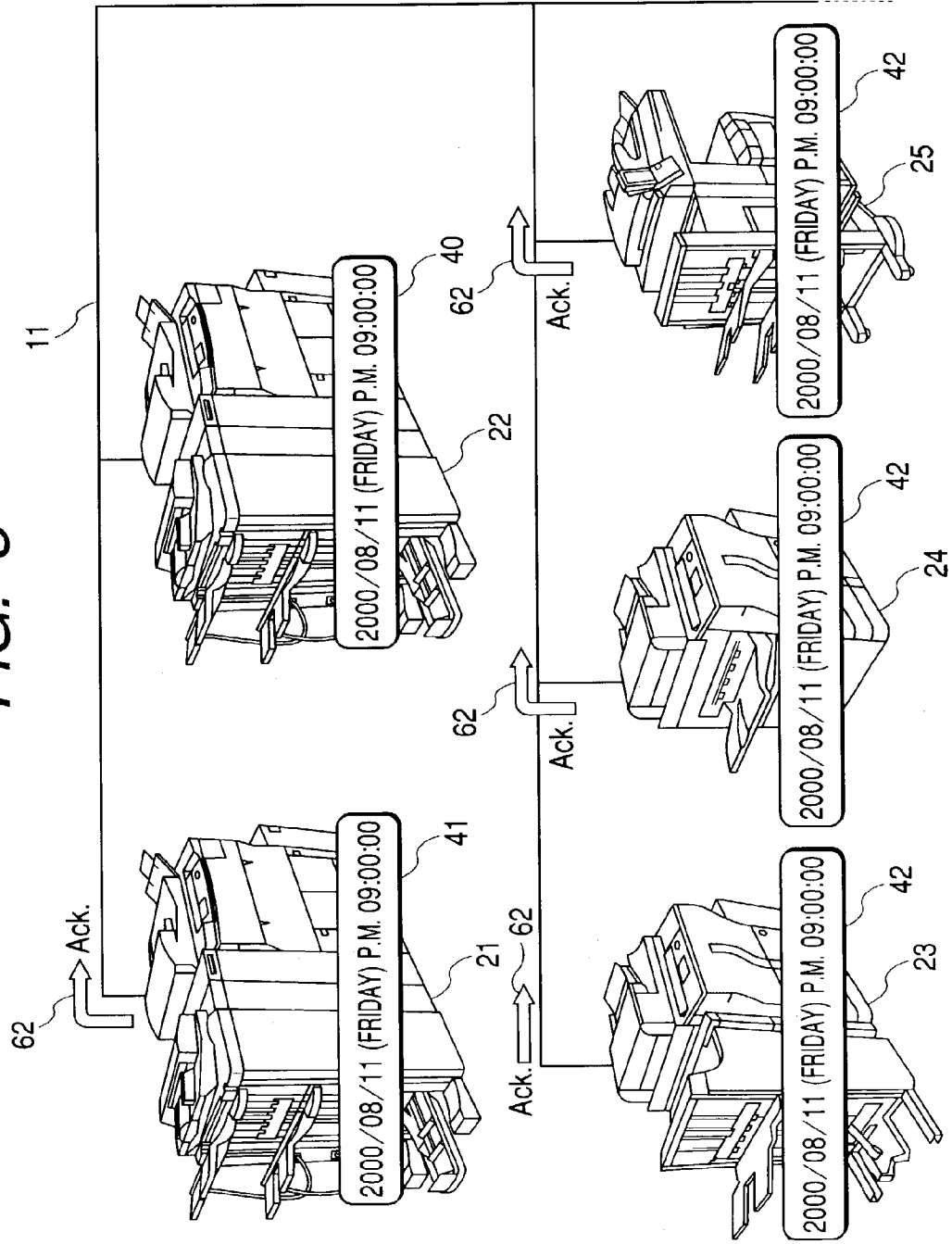
FIG. 5 is a diagram showing a state where each of the second output apparatuses 21 and 23 to 28 updates the power saving mode shift time information data built therein and responds to the first output apparatus 22.

FIGS. 4 and 5 are diagrams showing an outline of a mechanism such that the power saving mode shift time information data is transmitted from one output apparatus (one of 21 to 28) in which a power saving mode shift time information updating operation has been executed by the user among the output apparatuses 21 to 28 to each of the residual output apparatuses (residual apparatuses among 21 to 28) and the power saving mode shift time information data of the records 51 and 52 built in each of the residual output apparatuses is updated.

FIG. 4 is a diagram showing a state where the power saving mode shift time information data is transmitted from the first output apparatus 22 in which the power saving mode shift time information updating operation has been executed by the user to each of the second output apparatuses 21 and 23 to 28. FIG. 5 is a diagram showing a state where the power saving mode shift time information data from the first output apparatus 22 is received and each of the second output apparatuses 21 and 23 to 28 connected to the network 11 updates the power saving mode shift time information data built therein and responds to the first output apparatus 22.

Although the output apparatuses 26 to 28 are not shown, the operations of the output apparatuses 26 to 28 are similar to those of the output apparatuses 21 and 23 to 25, which will be explained hereinbelow.

First, in FIG. 4, the power saving mode shift time information data is transmitted from the first output apparatus 22 in which the power saving mode shift time information updating operation has been executed by the user to each of the second output apparatuses 21 and 23 to 28. In the diagram, such a flow of the data is shown by arrows 61. The power saving mode shift time information updating operation which is executed by the user will be described in detail with reference to FIG. 6 and subsequent diagrams.

Subsequently, when the power saving mode shift time information is received from the first apparatus 22, each of the second output apparatuses 21 and 23 to 28 connected to the network 11 executes a process for updating contents in power saving mode shift time information data areas 41 and 42 in the RAM in each output apparatus to the received power saving mode shift time information. Details of the updating process which is executed in each of the second output apparatuses 21 and 23 to 28 will be explained with reference to FIG. 9.

Subsequently, after the power saving mode shift time information is updated, each of the second output apparatuses 21 and 23 to 28 transmits a response to the first output apparatus 22 in order to notify the first output apparatus 22 of the end of the updating process. In FIG. 5, such a flow is shown by arrows 62.

It will be understood that owing to the above construction, the power saving mode shift time information in a power saving mode shift time information data area 40 updated in the first output apparatus 22 by the operation of the user and the power saving mode shift time information stored in each of the second output apparatuses 21 and 23 to 28 connected to the network 11 can be synchronized.

Figure 6:
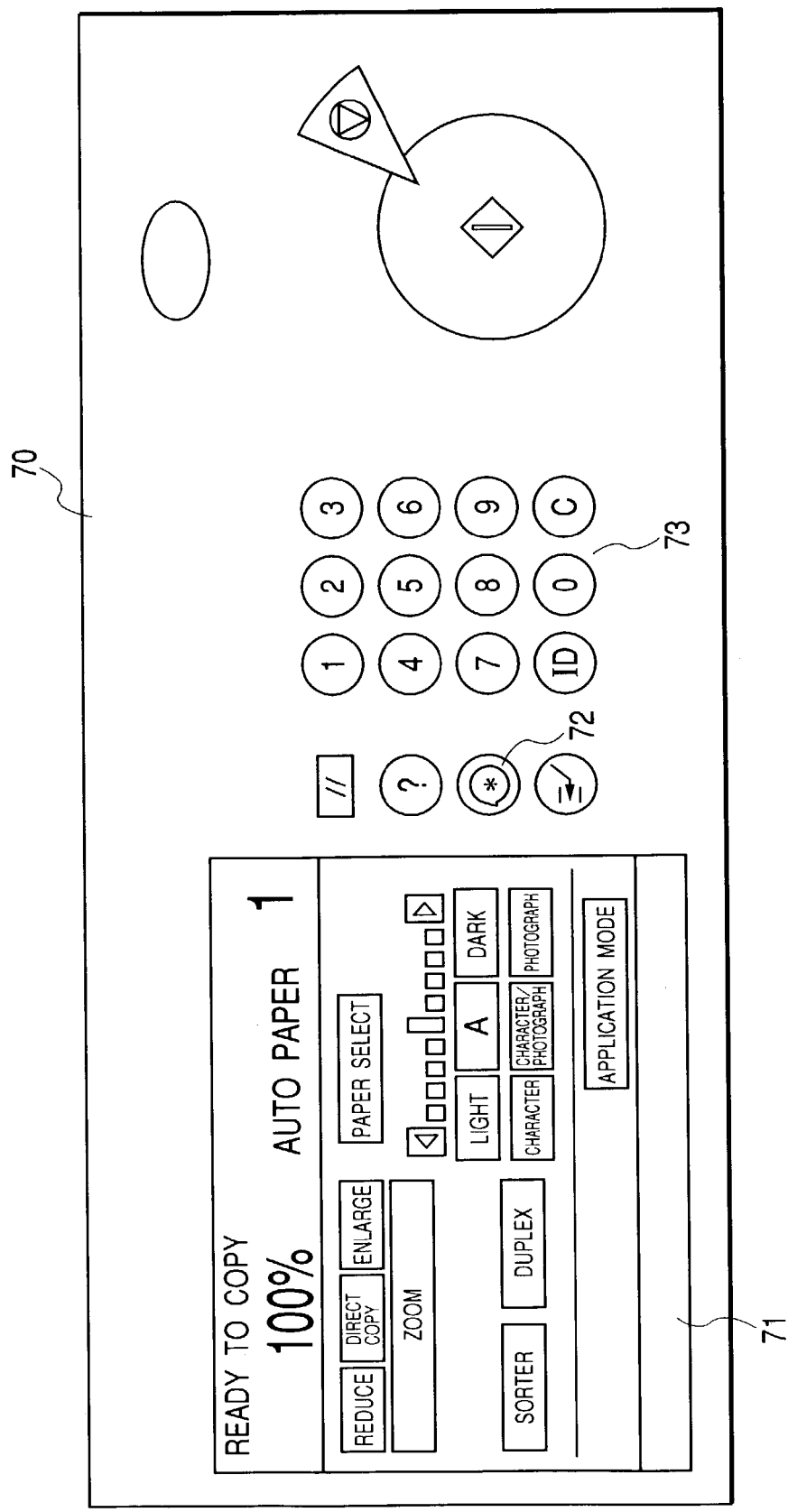
FIG. 6 is a diagram showing an example of an operation unit of the output apparatus in the invention.

FIG. 6 is a diagram showing an example of an operation unit of the output apparatus. An operation unit 70 plays a role of an interface at the time when the user executes a copying process, an image reading process, an image outputting process, various setting processes, and the like to the output apparatus.

Reference numeral 71 denotes a display unit. The display unit 71 plays a role of transmitting various information such as setting situation, operating situation, and the like of the output apparatus to the users. A pressure sensing device is built in the display unit 71. When the user presses various metaphors displayed in the display unit, the pressure sensing device detects them and the CPU 1 switches display contents and various settings in the display unit on the basis of detection information.

Reference numeral 72 denotes a user setting key. The user setting key 72 is pressed in the case of performing more detailed setting to the output apparatus. The user setting key 72 is used when an operation display screen for issuing an updating request of the power saving mode shift time information as a feature of the invention to the server is outputted to the display unit 71.

Reference numeral 73 denotes a ten-key. The ten-key 73 is used when setting which needs an input of numerical value information is performed to the output apparatus by the operation of the user.

Figure 7:
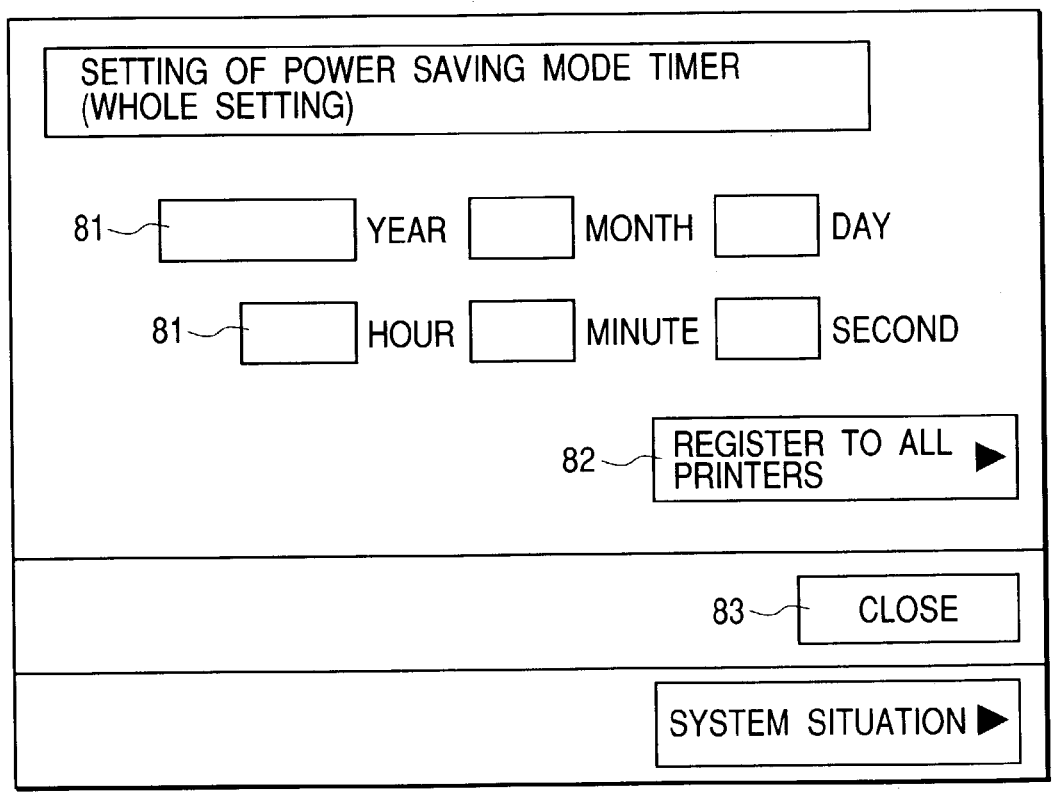
FIG. 7 is a diagram showing an example of an operation display screen for issuing an updating request of the power saving mode shift time information data to other output apparatuses connected to a network.

FIG. 7 is a diagram showing an example of the operation display screen for issuing the updating request of the power saving mode shift time information to other output apparatuses connected to the network. This display screen is displayed to the display unit 71 of the operation unit 70.

Reference numeral 81 denotes a display box for displaying the power saving mode shift time information data and allowing the user to change it. The display box 81 is divided into boxes of year, month, day, hour, minute, and second and the user executes the inputting operation by the ten-key 73.

Reference numeral 82 denotes an information register button. When the user executes a process for selecting the information register button 82 on the operation unit 70 of the output apparatus, the power saving mode shift time information data displayed in the display box 81 on the operation unit 70 is transmitted to other output apparatuses 21 and 23 to 28 connected to the network. When such data is received, each of other output apparatuses 21 and 23 to 28 executes a process for updating the power saving mode shift time information stored in the power saving mode shift time information data areas 41 and 42 built in the self apparatus to the power saving mode shift time information in the power saving mode shift time information data area 40 of the output apparatus 22.

Reference numeral 83 denotes an operation button to close the operation display screen for issuing the updating request of the power saving mode shift time information to the server.

Figure 8:
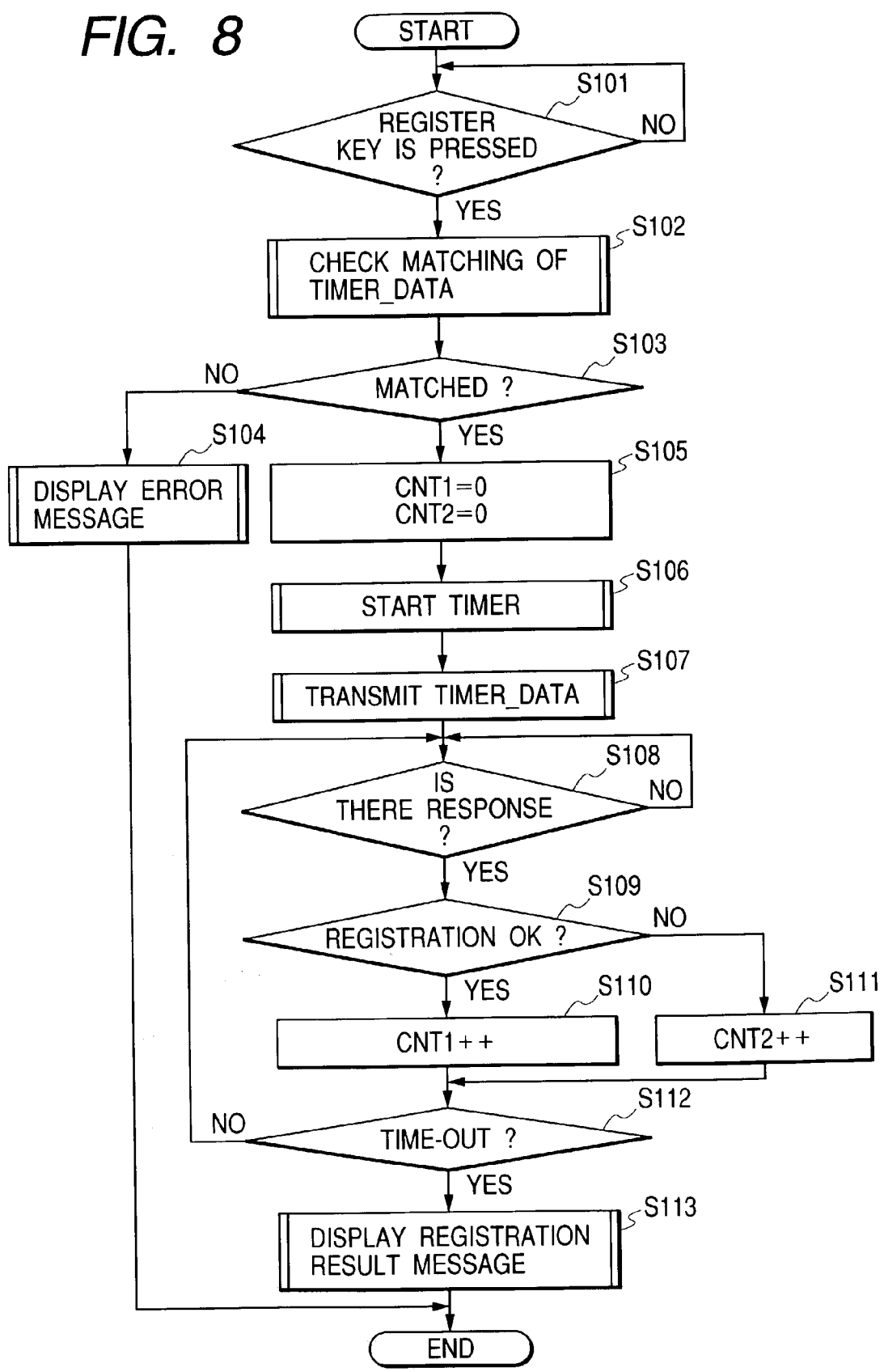
FIG. 8 is a flowchart showing a control flow for the output apparatus in the case where a process to select an information register button 82 is executed.

FIG. 8 is a flowchart showing a control flow for the output apparatus in the case where the process to select the information register button 82 is executed by the operation of the user on the operation display screen for issuing the updating request of the power saving mode shift time information shown in FIG. 6 to other output apparatuses 21 and 23 to 28. A program of this flowchart has been stored in the ROM 2, the RAM 3, or a proper external memory device (not shown) such as a hard disk drive or the like under the control of the CPU 1. Such a control is executed by the CPU 1 (a program of a flowchart of each diagram, which will be explained hereinlater, has also similarly been stored in the ROM 2, the RAM 3, or a proper external memory device (not shown) such as a hard disk drive or the like under the control of the CPU 1. Such a control is executed by the CPU 1).

Timer_Data denotes the power saving mode shift time information. CNT1 denotes a variable for counting the number of output apparatuses in which the power saving mode shift time information has been updated. CNT2 denotes a variable for counting the number of output apparatuses in which the power saving mode shift time information is not updated.

The above processing routine is started at timing when the operation display screen to issue the updating request of the power saving mode shift time information to other output apparatuses 21 and 23 to 28 is displayed on the operation unit 70. After the start of this processing routine, step 101 (in the diagram, each step is shown by "S") follows.

In step 101, whether the operation to select the information register button 82 has been executed or not is discriminated and a loop is formed until the selecting operation is executed. That is, step 101 plays a role of allowing the process to wait until the user selects the server register button 82. If the user selects the, server register button 82, the processing routine advances to step 102.

In step 102, a process for calling a process to check matching performance of the power saving mode shift time information Timer_Data is executed. Specifically speaking, whether the time/date of the power saving mode shift time information Timer_Data exists on an actual calendar or not or whether the time/date of the power saving mode shift time information Timer_Data exists in the future from the present time information held in the timer (measuring device) built in the output apparatus or not is discriminated. After completion of the discrimination, the processing routine advances to step 103.

In step 103, the process is branched in dependence on a discrimination result in step 102 about the presence or absence of the matching performance of the power saving mode shift time information Timer_Data. If there is the matching performance, step 105 follows. If there is no matching performance, step 104 follows.

In step 104, a process to display an error message to the display unit 71 of the operation unit 70 is executed in order to notify the user of the fact that since there is no matching performance in the power saving mode shift time information Timer_Data set by the user, it is not transmitted to other output apparatuses 21 and 23 to 28. After completion of the displaying process, the processing routine is finished.

In step 105, a process to initialize the variable CNT1 for counting the number of output apparatuses in which the power saving mode shift time information has been updated and the variable CNT2 for counting the number of output apparatuses in which the power saving mode shift time information is not updated is executed. After completion of the initialization, the processing routine advances to step 106.

In step 106, a process to start a timer device for measuring a response waiting time for a time of waiting for reception of a reply after the updating request of the power saving mode shift time information has been transmitted to each printer output apparatus is executed. After the start of the timer device, step 107 follows.

In step 107, a process to transmits the power saving mode shift time information Timer_Data together with the updating request to each of the output apparatuses 21 and 23 to 28 connected to the network is executed. After completion of the transmission of the updating request, step 108 follows.

In step 108, whether there is a response from each of the output apparatuses 21 and 23 to 28 to which the power saving mode shift time information Timer_Data has been transmitted or not is discriminated and a loop is formed until the reception of the response. That is, step 108 plays a role of allowing the process to wait until the response is made from each of the output apparatuses 21 and 23 to 28. If the response is made from each of the output apparatuses 21 and 23 to 28, the processing routine advances to step 109.

In step 109, a process to discriminate whether the output apparatus which made the response has updated the power saving mode shift time information Timer_Data or not is discriminated. If the output apparatus which made the response returned data showing that the power saving mode shift time information Timer_Data has been updated, the processing routine advances to step 110. If the output apparatus which made the response returned data showing that the information is not updated, the processing routine advances to step 111.

In step 111, since the output apparatus which made the response has updated the power saving mode shift time information Timer_Data, a process to increase the variable CNT1 for counting the number of output apparatuses in which the power saving mode shift time information has been updated is executed. After completion of this process, step 112 follows.

In step 111, since the output apparatus which made the response does not update the power saving mode shift time information Timer_Data, a process to increase the variable CNT2 for counting the number of output apparatuses in which the power saving mode shift time information is not updated is executed. After completion of this process, step 112 follows.

In step 112, a process to discriminate whether a measured time of the timer device for measuring a response waiting time has reached the response waiting time or not is executed. If the measured time of the timer device lies within the response time, the processing routine is returned to step 108 and the system waits for the response from the output apparatuses 21 and 23 to 28. If the measured time of the timer device reached the response time, it is determined that the time-out occurred. The processing routine advances to step 113.

In step 113, there is called a process for displaying, on the display unit 71 of the output apparatus, information of the number of output apparatuses in which the power saving mode shift time information has been updated by the update requesting process thereof by the operation of the user and the number of output apparatuses in which the power saving mode shift time information has not been updated based on the information of the variable CNT1 for counting the number of output apparatuses in which the power saving mode shift time information has been updated and the variable CNT2 for counting the number of output apparatuses in which the power saving mode shift time information is not updated. After completion of the display, the processing routine is finished.

Figure 9:
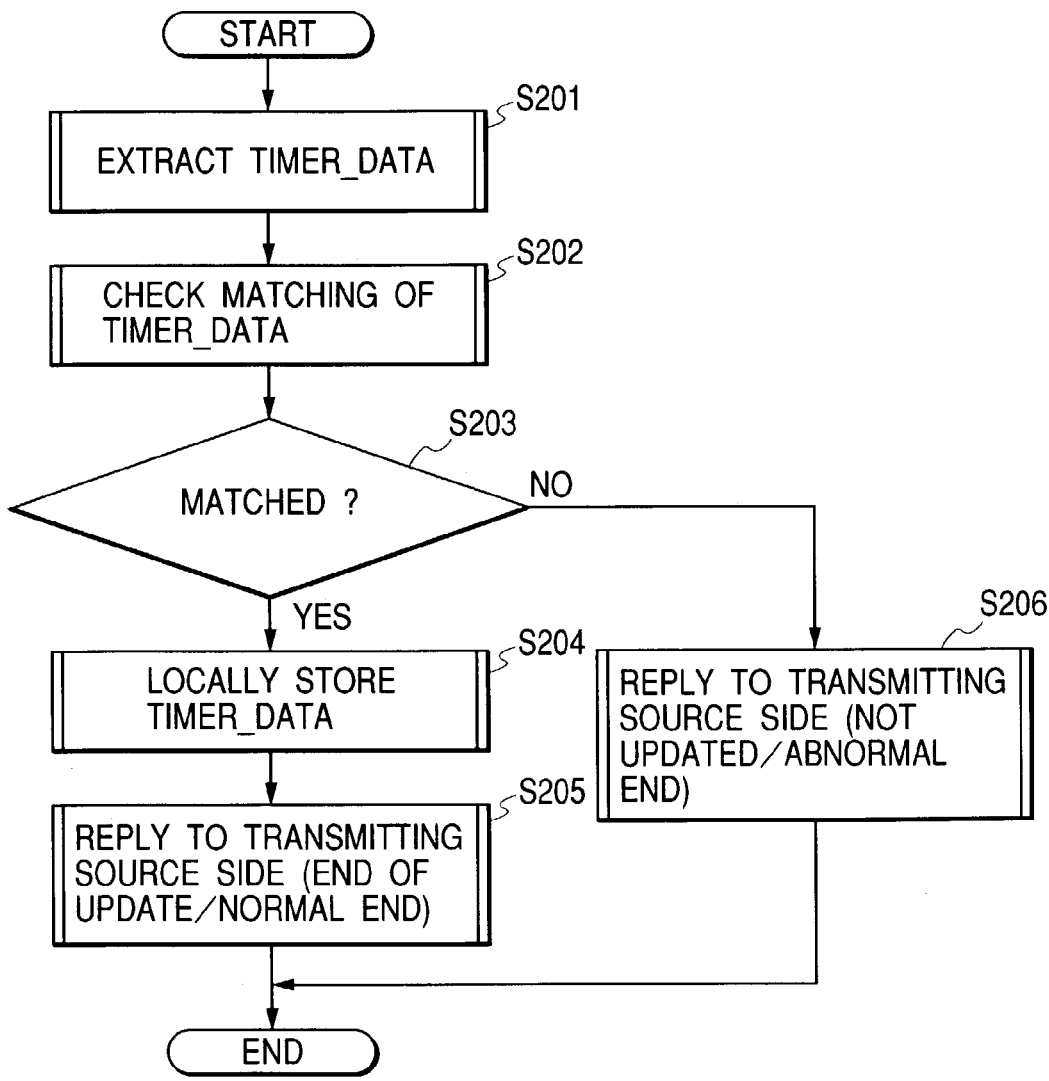
FIG. 9 is a flowchart showing processes on the side of the second output apparatuses 21 and 23 to 28 in the case where, in the second output apparatuses 21 and 23 to 28, the power saving mode shift time information data is transmitted from the first output apparatus 22.

FIG. 9 is a flowchart showing processes on the side of the second output apparatuses 21 and 23 to 28 in the case where, in the second output apparatuses 21 and 23 to 28, the power saving mode shift time information is transmitted from the first output apparatus 22. This processing routine is started at timing when the power saving mode shift time information is received from the first output apparatus 22. This processing routine is executed by the CPU in each of the second output apparatuses 21 and 23 to 28.

After this processing routine is started, step 201 (in the diagram, each step is shown by "S") follows.

In step 201, a process to extract the power saving mode shift time information Timer_Data from the data format received from the server 12 is called. After completion of the extraction of the power saving mode shift time information Timer_Data, the processing routine advances to step 202.

In step 202, a process to call the process for discriminating the matching performance of the power saving mode shift time information Timer_Data is executed. Specifically speaking, whether the time/date of the power saving mode shift time information Timer_Data exists on the actual calendar or not or whether the time/date of the power saving mode shift time information Timer_Data exists in the future from the present time information held in the measuring device built in the output apparatus or not is discriminated. After completion of the discrimination, the processing routine advances to step 203.

In step 203, the process is branched in dependence on a discrimination result in step 202 about the presence or absence of the matching performance of the power saving mode shift time information Timer_Data. If there is the matching performance, that is, if the time/date of the power saving mode shift time information Timer_Data exists on the actual calendar or if the time/date of the power saving mode shift time information Timer_Data exists in the future from the present time information held in the measuring device built in the output apparatus, step 204 follows. If there is no matching performance, step 206 follows.

In step 204, a process to store the power saving mode shift time information Timer_Data into the power saving mode shift time information data area of the output apparatus is executed. Thus, if the present time information held in the measuring devices built in each of the second output apparatuses 21 and 23 to 28 is matched with the power saving mode shift time information Timer_Data, the output apparatus executes a process for shifting the operating mode to the power saving mode. After completion of the storing process, step 205 follows.

In step 205, a process to notify the first output apparatus 22 of the fact that the power saving mode shift time information Timer_Data has correctly been updated in the output apparatus which is executing the process is executed. After completion of the responding process, this processing routine is finished.

Step 206 is a process which is executed if it is determined in step 202 that there is no matching performance in the power saving mode shift time information Timer_Data. The power saving mode shift time information data area built in the second output apparatuses 21 and 23 to 28 is not updated and a process to notify the first output apparatus 22 of the fact that the power saving mode shift time information is not updated is executed. After completion of the responding process, this processing routine is finished.

As described above, in the embodiment, the power saving mode shift time information data is transmitted from the output apparatus in which the power saving mode shift time information data has been updated by the operation of the user to each of other output apparatuses via the network, so that the power saving mode shift time information of each output apparatus can be synchronously updated.

That is, by the operation of the user from a certain output apparatus connected to the network, the power saving mode shift time information of all of the residual output apparatuses connected to the network can be automatically updated.

Thus, the user does not need to go to each of the output apparatuses connected to the network each time and execute the setting operation of the power saving mode shift time information. The improvement of the use convenience of the user can be expected.

The users near the output apparatuses can be notified of the fact that the power saving mode shift time memory information has been updated.

Further, the users near the output apparatuses can be notified of the fact that the power saving mode shift time memory information has been updated.

Moreover, when multiaddress communication for requesting the updating of the power saving mode shift time information is made from the printer to each printer on the network, if each printer which received such a request does not update the power saving mode shift time memory information held therein, the printers which did not update the information automatically sends a response showing that the information is not updated to the printer on the transmitting destination side. By receiving such a response, the printer can display a message showing that the information is not updated onto the display apparatus.

Further, the printer has the display apparatus which can be operated by the user in an interactive manner, when the multiaddress communication for requesting the updating of the power saving mode shift time information is made from the printer to each printer on the network, the printer has first counting means for counting the number of printers in which the information has been updated in response to the response from each printer and second counting means for counting the number of printers in which the information is not updated and can display count results of the first and second counting means onto the display apparatus, respectively.

Owing to the above construction, the user who executed the setting requesting operation of the power saving mode shift time information from a certain output apparatus to all of the output apparatuses connected to the network can confirm whether the updating processes of all of the output apparatuses have normally been finished or not and confirm the number of output apparatuses in which the updating process has been executed and the number of output apparatuses in which the updating process is not executed onto the display unit of the output apparatus to which the setting has been performed by the user. The use convenience of the user can be improved.

EMBODIMENT 2

Figure 11:
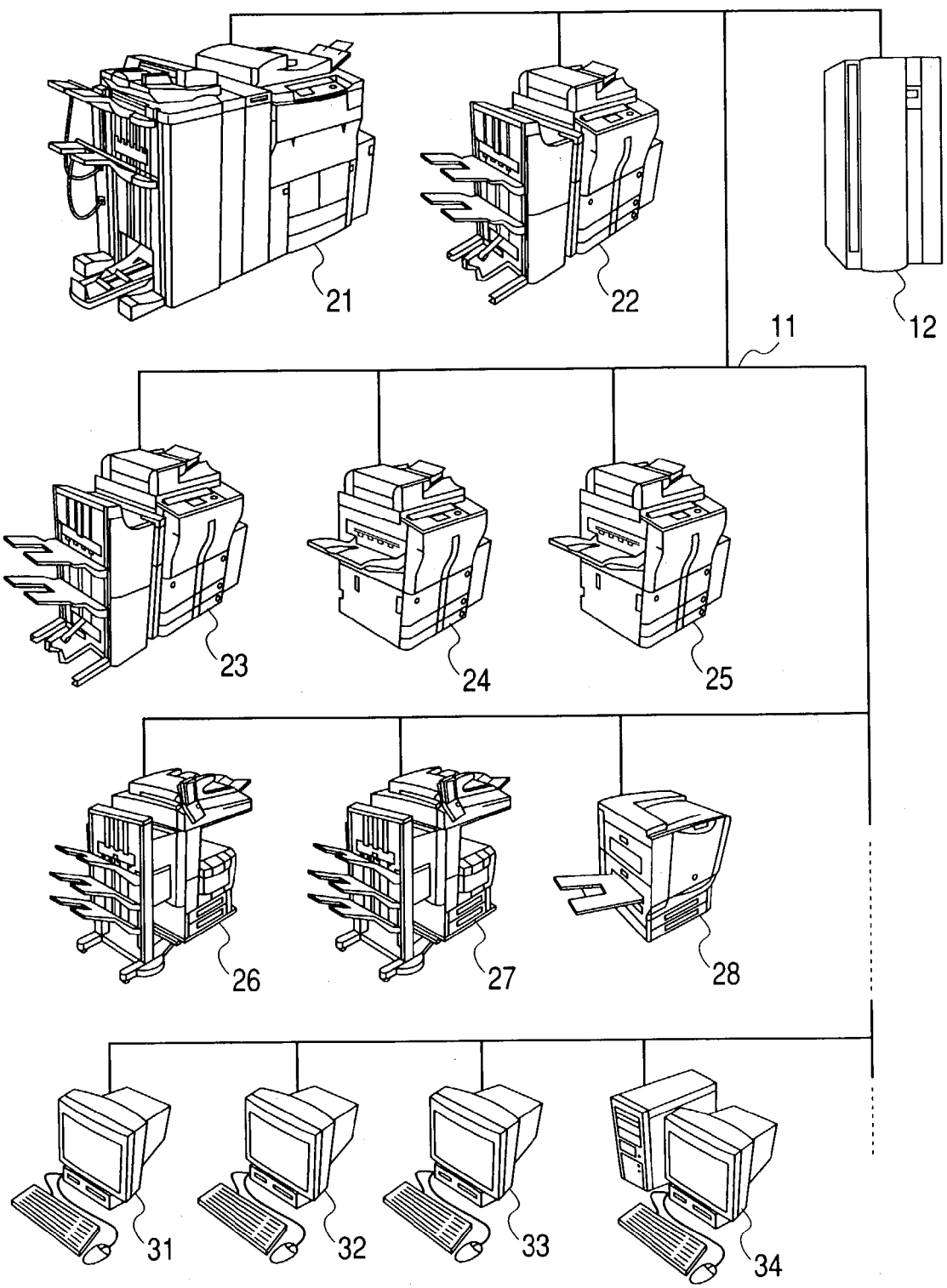
FIG. 11 is a diagram showing a schematic construction of the network system.

FIG. 11 is a diagram showing a schematic construction of the network system in the embodiment. Reference numeral 11 denotes the network. A server 12, the output apparatuses 21 to 28, and computers and workstations 31 to 34 are connected to the network 11, respectively. The network 11 plays a role as a transfer medium of information.

Figure 21:
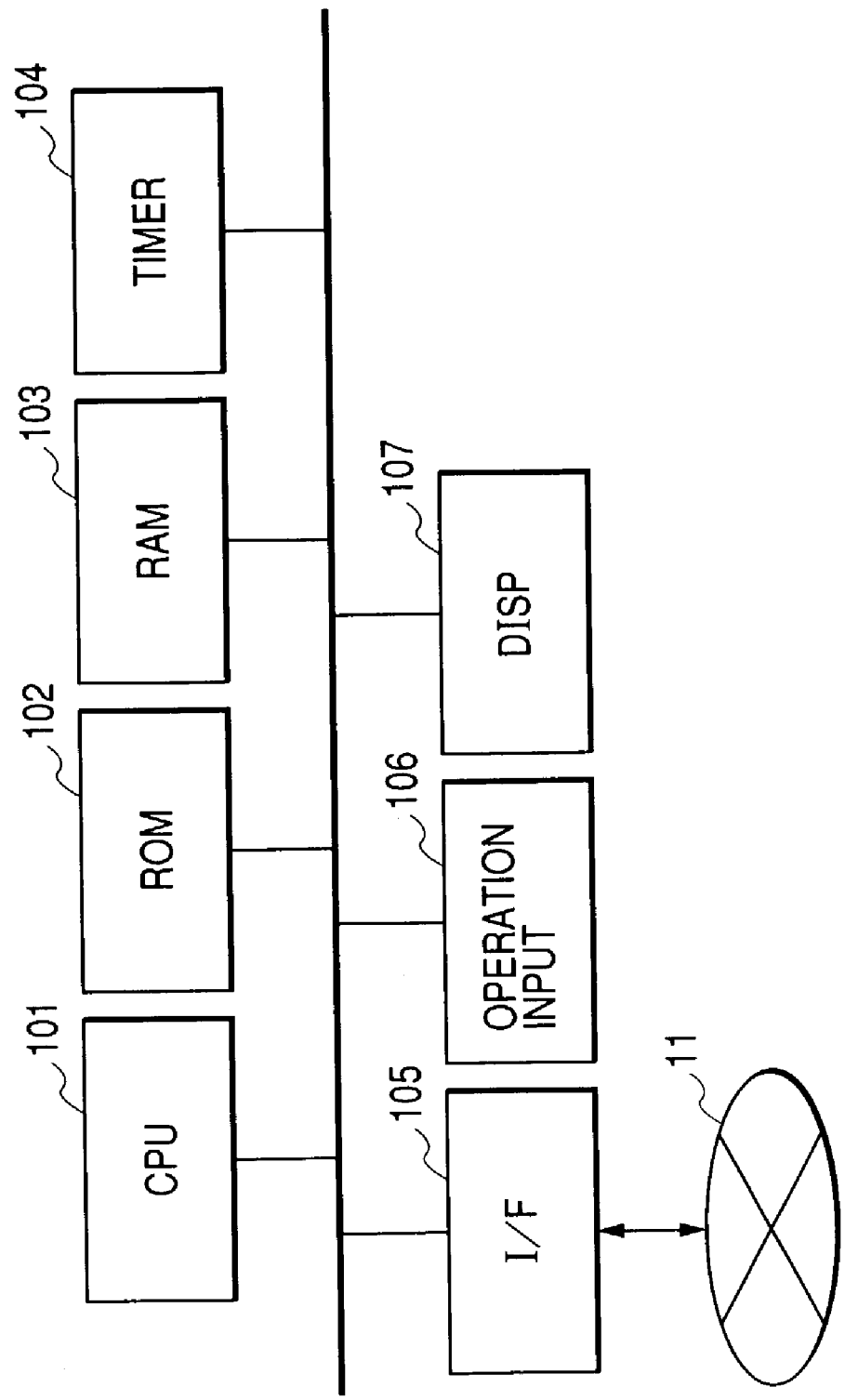
FIG. 21 is a diagram showing a construction of the server.

A function of a timer management server as a feature of the invention has been built in as one system of the server 12 and provides a server service in the network together with other functions, the server 12 has a construction as shown in FIG. 21 (each of the following embodiments also has a similar construction). In FIG. 21, reference numeral 101 denotes a CPU for controlling the operation of the whole server; 102 a ROM in which a control procedure of the CPU 101 has been stored; 103 a RAM which provides a work area (including each data area, which will be explained hereinlater) of the CPU 101; 104 a timer (one or a plurality of timers) serving as time measuring means; 105 an interface for controlling the transmission and reception of data between the network 11 and the server; 106 an operation input unit which includes the operating unit having the display means shown in FIG. 5 and the like and executes various inputting operations, which will be explained hereinlater, from the user; and 107 display means.

Reference numerals 31 to 34 denote the general computers and workstations each having input means such as a keyboard or the like and output means such as a display or the like. Those apparatuses correspond to client apparatuses on the network 11. Various service requests are sent from the computers and workstations 31 to 34 to the sensor 12 and the output apparatuses 21 to 28, respectively.

Figure 12:
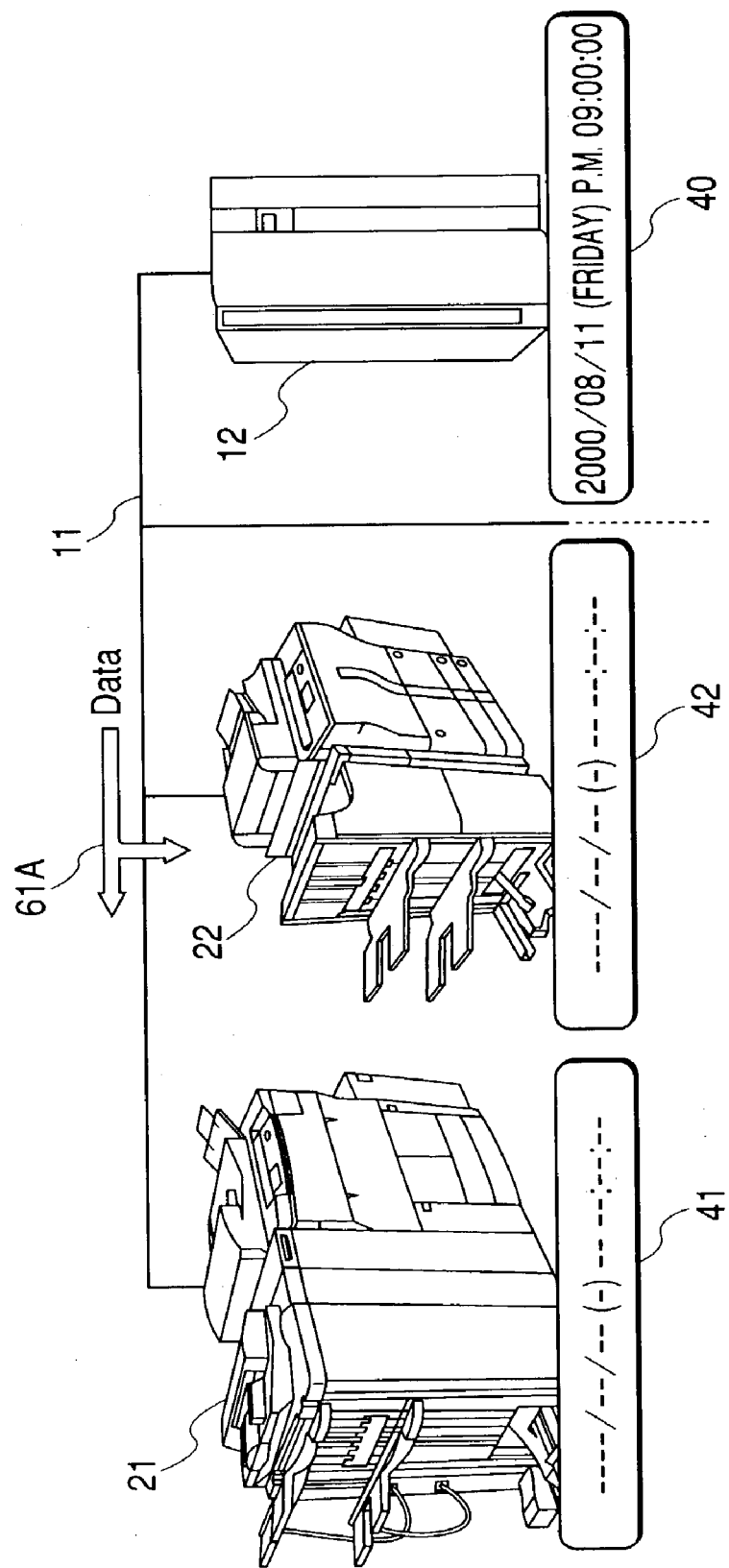
FIG. 12 is a diagram showing a state where a server 12 transmits the power saving mode shift time information data stored therein to the output apparatuses 21 to 28 connected to a network 11.
Figure 13:
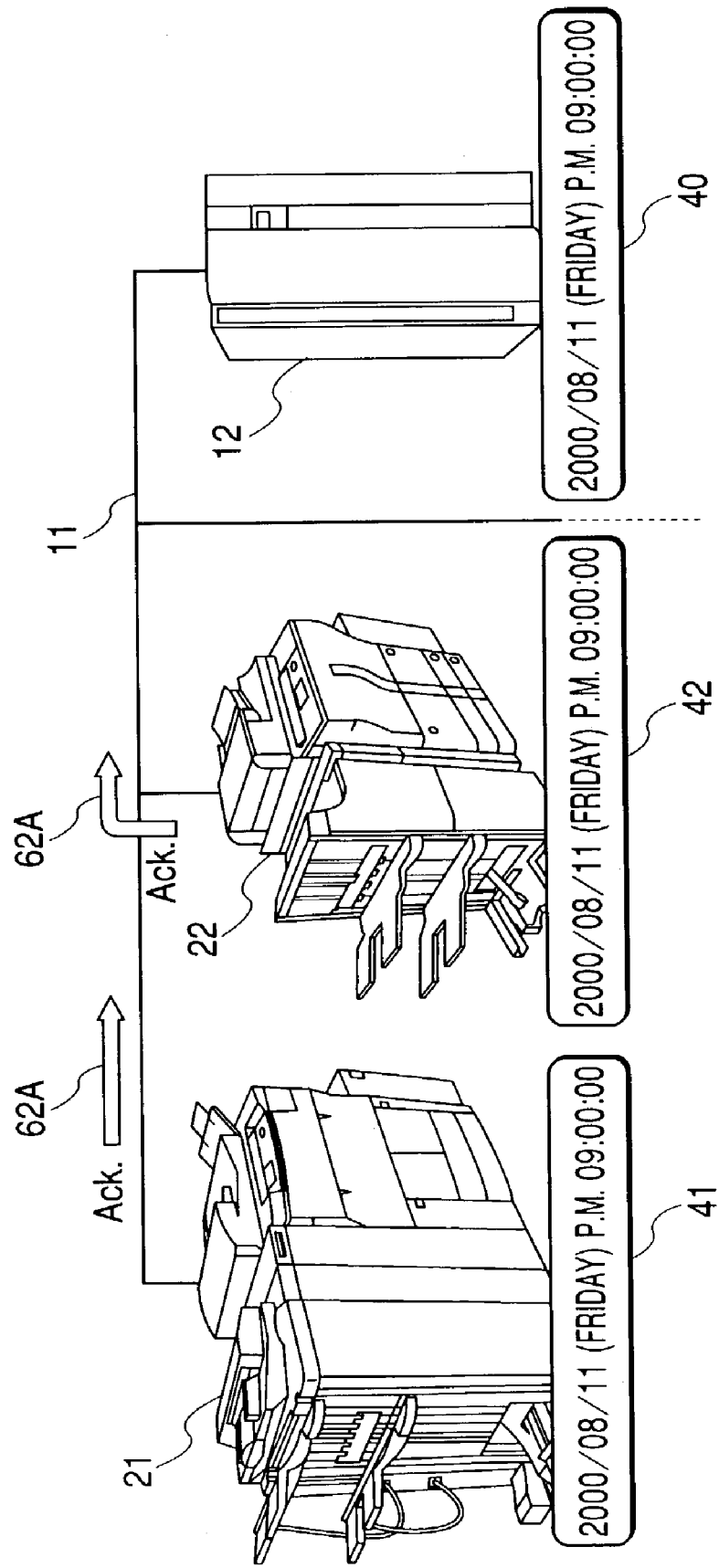
FIG. 13 is a diagram showing a state where each of the output apparatuses 21 to 28 updates the built-in power saving mode shift time information data and responds to the server.

FIGS. 12 and 13 are diagrams showing an outline of a mechanism such that the power saving mode shift time information data stored in the server 12 is transmitted to the output apparatuses 21 to 28 connected to the network 11 and the power saving mode shift time information data in each of the output apparatuses 21 to 28 is updated.

FIG. 12 is a diagram showing a state where the server 12 transmits the power saving mode shift time information data stored therein (RAM) to the output apparatuses 21 to 28 connected to the network 11. FIG. 13 is a diagram showing a state where each of the output apparatuses 21 to 28 connected to the network 11 receives the power saving mode shift time information data from the server 12, updates the built-in power saving mode shift time information data, and responds to the server.

Although the output apparatuses 23 to 28 are not shown here, the operation of each of the output apparatuses 23 to 28 is similar to that of the output apparatuses 21 and 22, which will be explained hereinbelow.

First, in FIG. 12, the server 12 transmits the power saving mode shift time information stored in the power saving mode shift time information data area 40 in the RAM to each of the output apparatuses 21 to 28 connected to the network 11. In the diagram, this flow is shown by arrows 61A. The transmitting operation is executed at timing when the power saving mode shift time information data area 40 in the server 12 is updated.

When the power saving mode shift time information is received from the server 12, each of the output apparatuses 21 to 28 connected to the network 11 executes a process for updating the contents in the power saving mode shift time information data areas 41 and 42 in the RAM of each output apparatus to the received power saving mode shift time information. Details of the updating process of the power saving mode shift time information which is executed in each of the output apparatuses 21 to 28 will be explained with reference to FIG. 14.

After the power saving mode shift time information is updated, each of the output apparatuses 21 to 28 transmits a response to the server 12 in order to notify the server of the end of the updating process. In the diagram, this flow is shown by arrows 62A.

It will be understood that owing to the above construction, the power saving mode shift time information held in the server 12 and the power saving mode shift time information stored in each of the output apparatuses 21 to 28 connected to the network 11 can be synchronized.

Figure 14:
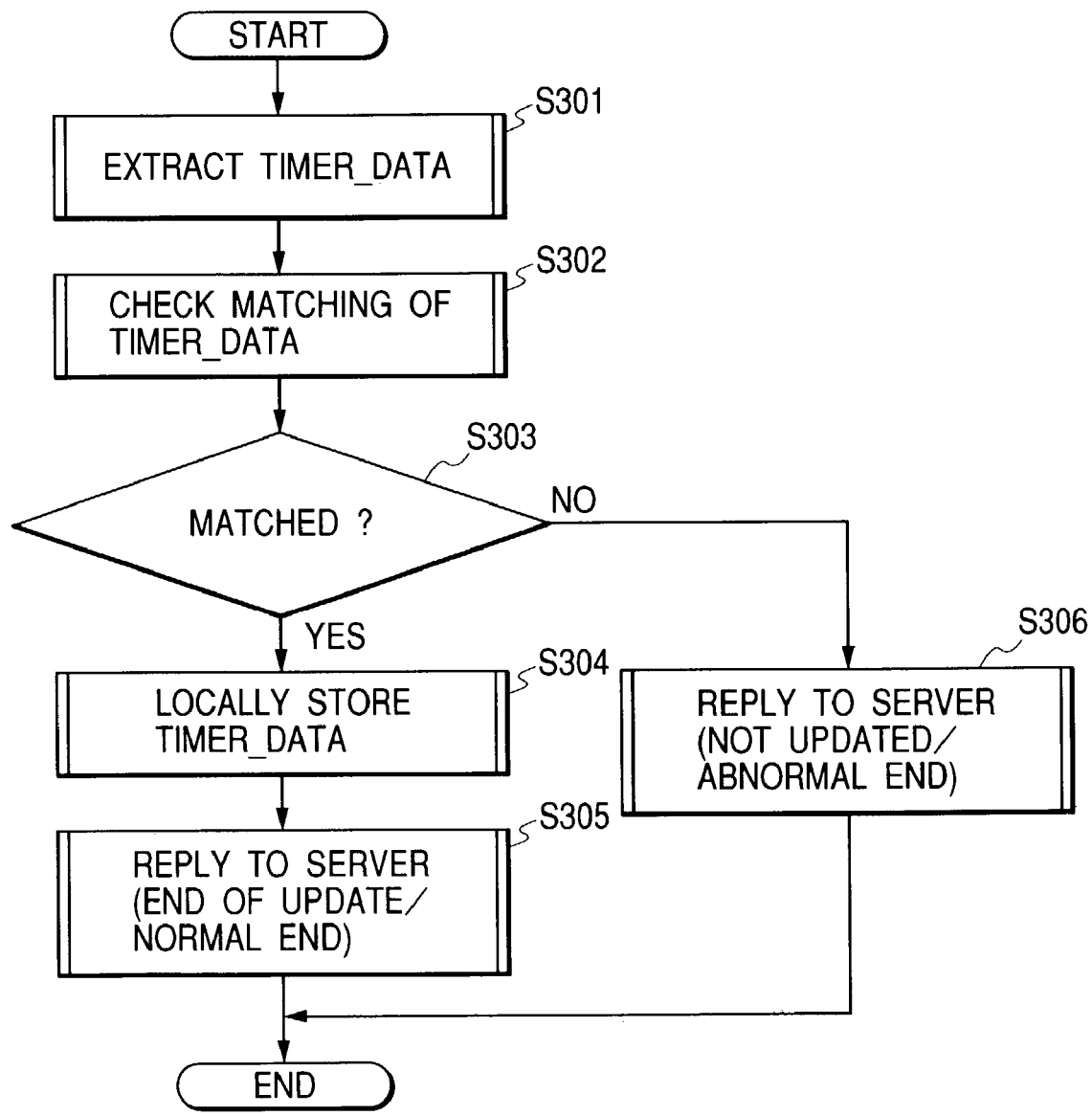
FIG. 14 is a flowchart showing a process on the output apparatus side in the case where, in the output apparatuses 21 to 28, the power saving mode shift time information data is transmitted from the server 12.

FIG. 14 is a flowchart showing a process on the output apparatus side in the case where, in the output apparatuses 21 to 28, the power saving mode shift time information is transmitted from the server 12. This processing routine is started at timing when the power saving mode shift time information is received from the server 12. This processing routine is executed by the control unit built in each of the output apparatuses 21 to 28.

Timer_Data denotes the power saving mode shift time information. After the start of this processing routine, step 301 (in the diagram, each step is shown by "S") follows.

In step 301, a process to extract the power saving mode shift time information Timer_Data from the data format received from the server 12 is called. After completion of the extraction of the power saving mode shift time information Timer_Data, the processing routine advances to step 302.

In step 302, a process to call a process for discriminating the matching performance of the power saving mode shift time information Timer_Data is executed. Specifically speaking, whether the time/date of the power saving mode shift time information Timer_Data exists on the actual calendar or not or whether the time/date of the power saving mode shift time information Timer_Data exists in the future from the present time information held in the measuring device in the output apparatus or not is discriminated. After completion of the discrimination, the processing routine advances to step 303.

In step 303, the process is branched in dependence on a discrimination result in step 302 about the presence or absence of the matching performance of the power saving mode shift time information Timer_Data. If there is the matching performance, step 304 follows. If there is no matching performance, step 306 follows.

In step 304, a process to store the power saving mode shift time information Timer_Data into the power saving mode shift time information data area in the output apparatus is executed. Thus, if the present time information of the measuring device in the output apparatus coincides with the power saving mode shift time information Timer_Data, the output apparatus executes the process to shift the operating mode to the power saving mode. After completion of the storing process, step 305 follows.

In step 305, a process to notify the server 12 of the fact that the power saving mode shift time information Timer_ Data has correctly been updated in the output apparatus which is executing the processing routine is executed. After completion of the responding process, the processing routine is finished.

Step 306 is a process which is executed if it is determined in step 302 that there is no matching performance in the power saving mode shift time information Timer_Data. The power saving mode shift time information data area in the output apparatus is not updated and a process to notify the server 12 of the fact that the power saving mode shift time information is not updated is executed. After completion of the responding process, this processing routine is finished.

Figure 15:
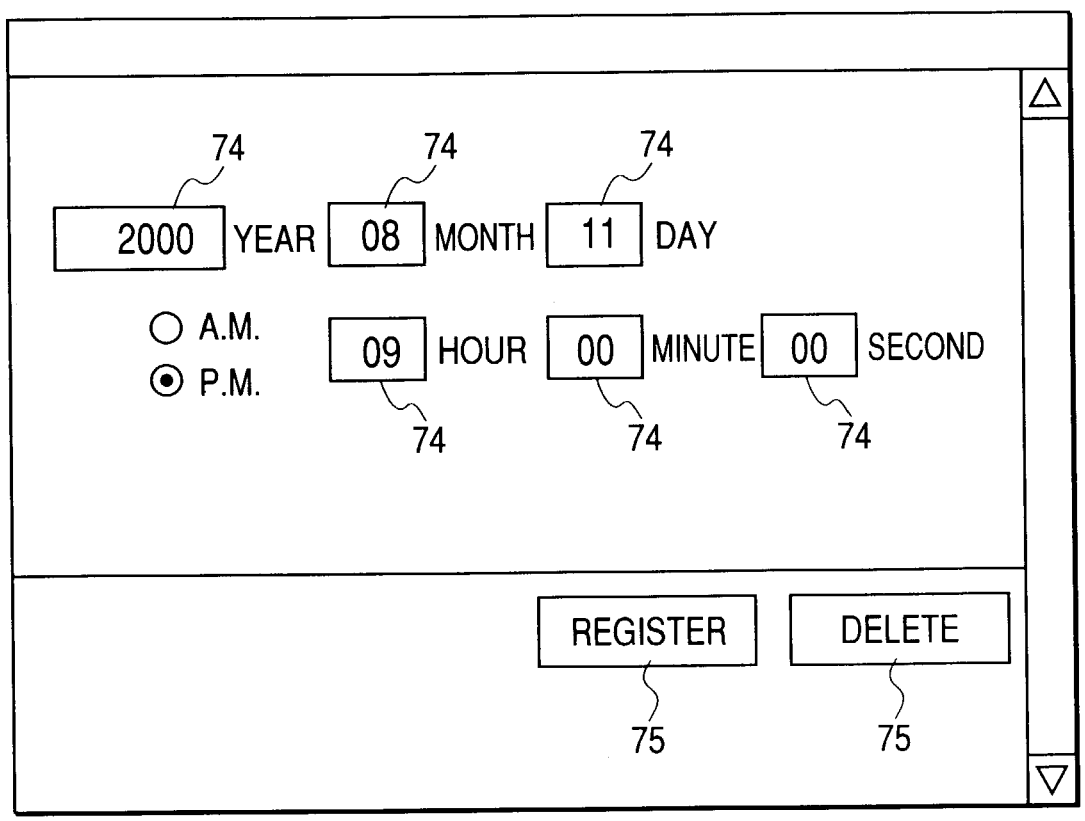
FIG. 15 is a diagram showing an example of a display of clientware for updating the power saving mode shift time information data built in the server 12 on the side of client apparatuses 31 to 34.

FIG. 15 is a diagram showing an example of a display of clientware (display means of the client apparatus) for updating the power saving mode shift time information data in the server 12 on the side of client apparatuses 31 to 34. Reference numeral 74 denotes a display box for displaying the power saving mode shift time information data. The display box 74 is divided into boxes of year, month, day, hour, minute, and second and the user can rewrite the data from the client apparatus.

Reference numeral 75 denotes a register button. When the user executes a process for selecting the register button 75 from the client apparatus, the power saving mode shift time information data displayed in the display box 74 on the client apparatus is transmitted to the server 12. On the server 12 side, when such data is received, a process to update the power saving mode shift time information stored in the power saving mode shift time information data area 40 in the server 12 is executed.

If the process to update the power saving mode shift time information is executed in the server 12, it is used as a trigger and a process to transmit the updated power saving mode shift time information to each of the output apparatuses 21 to 28 connected to the network 11 is started.

Reference numeral 76 denotes a delete button. When the user executes a process to select the delete button 76 from the client apparatus, each of the client apparatuses 31 to 34 executes a process for transmitting a deleting request to delete the power saving mode shift time information data displayed in the display box 74 on the client apparatus from the power saving mode shift time information data area 40 in the server 12 to the server 12.

When the data deleting request is received from each of the client apparatuses 31 to 34, the server 12 side executes a process for deleting the corresponding power saving mode shift time information stored in the power saving mode shift time information data area 40 in the server 12. As described above, in the embodiment, in the server, the power saving mode shift time information of each of the output apparatuses connected to the network is concentratedly managed, the power saving mode shift time information data is transmitted from the server to each of the output apparatuses via the network, and the power saving mode shift time information of each output apparatus can be synchronously updated. That is, the user does not need to go to each of the output apparatuses connected to the network each time and execute the setting operation of the power saving mode shift time information. The improvement of the use convenience of the user can be expected.

It is possible to avoid a situation such that the user executes the setting operation of the different power saving mode shift time information data to the timers of the output apparatuses or a situation such that the user carelessly forgets to set the power saving mode shift time information data to the timers of the output apparatuses. The improvement of a decrease in electric power consumption can be expected.

Further, by updating the power saving mode shift time information held in the server from the client apparatuses also connected to the network, the power saving mode shift time information held in the server can be updated from an arbitrary client apparatus also connected to the network by the operation of the user. Thus, the improvement of the use convenience of the user can be expected.

Further, if the power saving mode shift time information held in the server is updated, the updating timing is used as a trigger and each printer connected to the network is notified of the power saving mode shift time information, so that simultaneously with the updating of the power saving mode shift time information held in the server, the power saving mode shift time information can be reflected to each of the output apparatuses connected to the network.

Moreover, the printer on the network is notified of the power saving mode shift time information by the server and, when the power saving mode shift time information held in the printer is updated, a message showing that the power saving mode shift time information has been updated is displayed to the display means, so that the printer can notify the users near the output apparatuses of the fact that the power saving mode shift time information has been updated.

EMBODIMENT 3

Since a construction of hardware of the embodiment 3 is similar to that of the embodiment 2, its detailed description is omitted.

Figure 16:
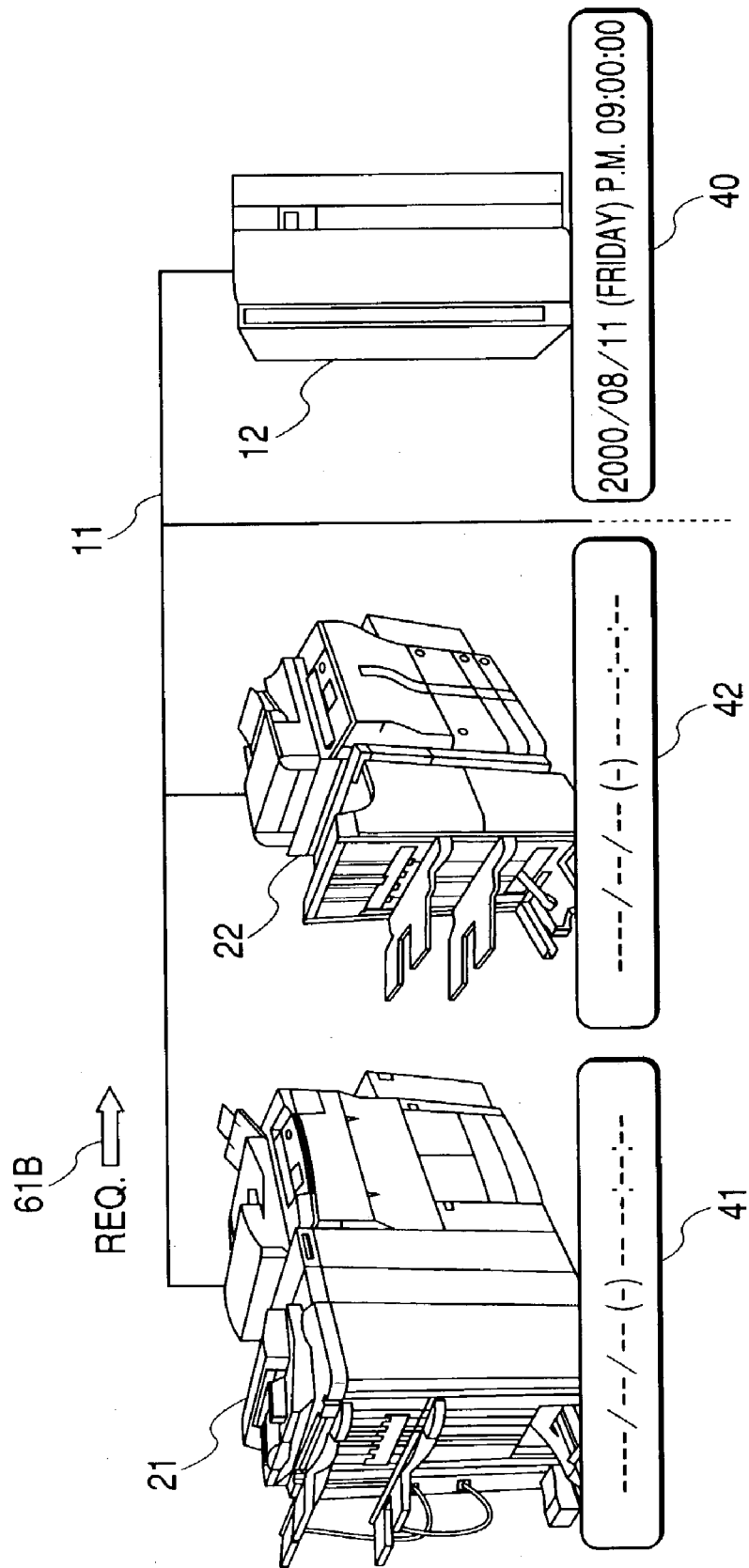
FIG. 16 is a diagram showing a state where the output apparatus 21 transmits an obtaining request of the power saving mode shift time information data to the server 12.
Figure 17:
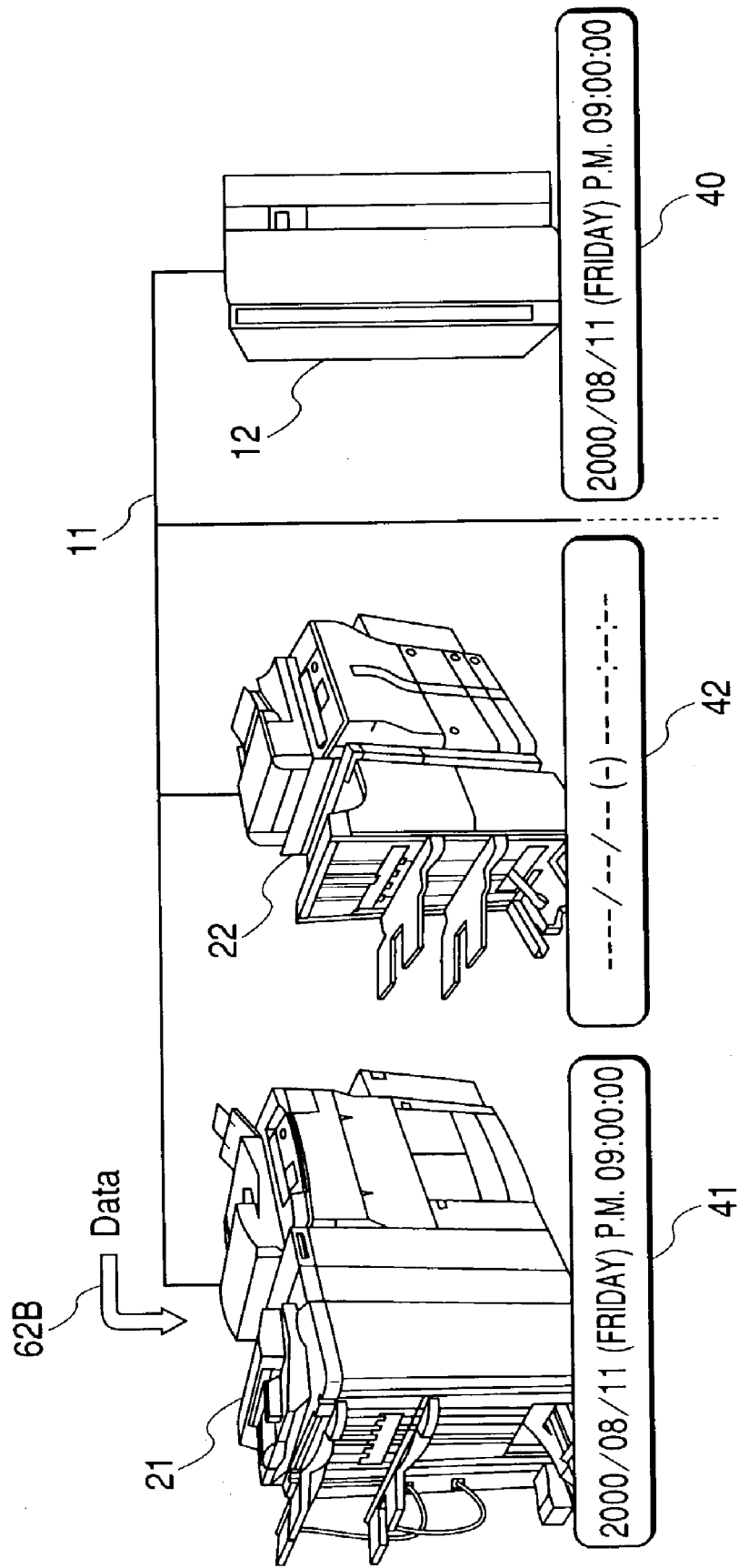
FIG. 17 is a diagram showing a state where the power saving mode shift time information data from the server 12 is received and the power saving mode shift time information data built in the output apparatus 21 is updated.

FIGS. 16 and 17 are diagrams showing an outline of a mechanism such that the power saving mode shift time information data stored in the server 12 is reflected to the power saving mode shift time information areas of the records 51 and 52 in each of the output apparatuses 21 to 28, respectively.

FIG. 16 is a diagram showing a state where the output apparatus 21 transmits an obtaining request of the power saving mode shift time information to the server 12 connected to the same network 11. FIG. 17 is a diagram showing a state where the power saving mode shift time information data from the server 12 is received and the power saving mode shift time information data built in the output apparatus 21 is updated.

First, in FIG. 16, the output apparatus 21 transmits the obtaining request of the power saving mode shift time information to the server 12. In the diagram, this flow is shown by an arrow 61B. The transmitting operation is executed at predetermined time intervals on the basis of the measurement of a second timer in the output apparatus 21.

Subsequently, in FIG. 17, the server 12 which received the obtaining request of the power saving mode shift time information transmits the power saving mode shift time information stored in the power saving mode shift time information data area 40 provided therein. The transmitting destination side transmits the information to the output apparatus 21 which issued the obtaining request. In the diagram, this flow is shown by an arrow 62B.

Subsequently, when the power saving mode shift time information is received from the server 12, the output apparatus 21 connected to the network 11 executes a process to update the contents of the power saving mode shift time information data area 41 in the output apparatus 21 to the received power saving mode shift time information. Details of the obtaining requesting process and the updating process of the received power saving mode shift time information which are executed in the output apparatus 21 have been mentioned here will be described with reference to FIG. 18.

Although the description regarding the operations of the output apparatuses 22 to 28 is omitted here, the same operation as that in the output apparatus 21 described above is executed.

As mentioned above, each of the output apparatuses 21 to 28 issues the obtaining request of the power saving mode shift time information to the server 12 and makes control such that the power saving mode shift time information obtained by each of the output apparatuses 21 to 28 is reflected and the operating mode is shifted to the power saving mode, so that the power saving mode shift time information in each of the output apparatuses 21 to 28 can be automatically set.

Figure 18:
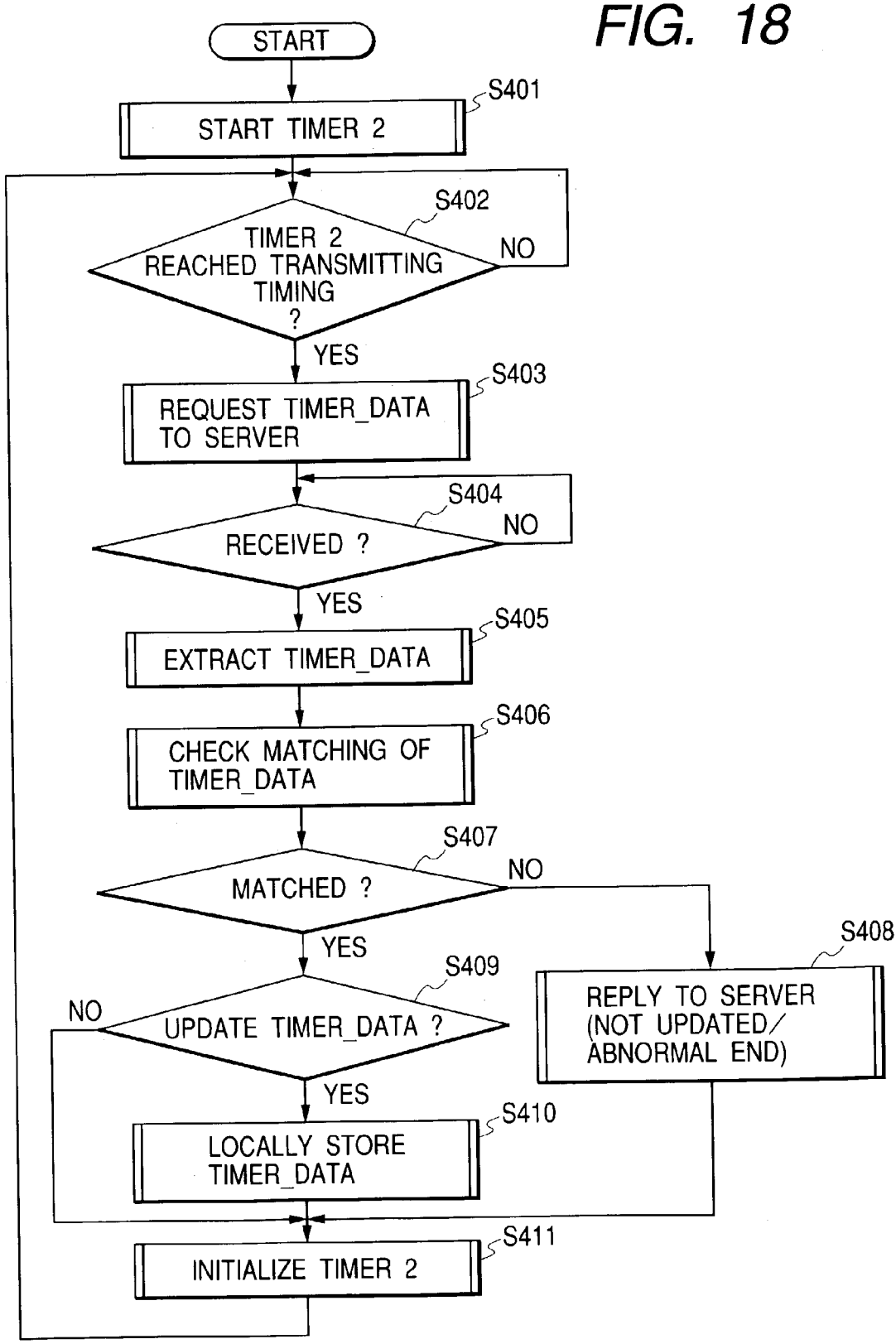
FIG. 18 is a flowchart showing processes on the output apparatus side in the case where, in the output apparatuses 21 to 28, a power saving mode shift time information obtaining request and the power saving mode shift time information data are transmitted to the server 12.

FIG. 18 is a flowchart showing processes on the output apparatus side in the case where, in the output apparatuses 21 to 28, the power saving mode shift time information obtaining request and the power saving mode shift time information are transmitted to the server 12. This processing routine is started at timing when a power source of each of the output apparatuses 21 to 28 is turned on.

Timer_Data denotes the power saving mode shift time information. After the start of this processing routine, step 401 (in the diagram, each step is shown by "S") follows.

In step 401, a process to activate the second timer for measuring the time interval to execute the transmission of the power saving mode shift time information obtaining request to the server 12 is called. After the second timer is activated, the processing routine advances to step 402.

In step 402, a process to discriminate whether the measured time of the second timer has reached the timing of executing the transmission of the power saving mode shift time information obtaining request or not. A loop is formed until the second timer reaches the timing of executing the transmission of the obtaining request. That is, step 402 plays a role of allowing the system to wait for the process until the timing comes. If the second timer reaches the timing of executing the transmission of the obtaining request, the processing routine advances to step 403.

In step 403, a process for allowing the output apparatus to transmit the power saving mode shift time information obtaining request to the server 12. After completion of the transmission, the processing routine advances to step 404.

In step 404, whether the response to the power saving mode shift time information obtaining request has been received from the server 12 or not is discriminated. A loop is formed until the response to the power saving mode shift time information obtaining request is received from the server 12. That is, step 404 plays a role of allowing the system to wait for the process until the response is received. If the response to the power saving mode shift time information obtaining request is received from the server 12, the processing routine advances to step 405.

In step 405, a process to extract the power saving mode shift time information Timer_Data from the data format of the power saving mode shift time information of the response received from the server 12 is called. After completion of the extraction of the power saving mode shift time information Timer_Data, the processing routine advances to step 406.

In step 406, a process to call a process for discriminating the matching performance of the power saving mode shift time information Timer_Data is executed. Specifically speaking, whether the time/date of the power saving mode shift time information Timer_Data exists on the actual calendar or not or whether the time/date of the power saving mode shift time information Timer_Data exists in the future from the present time information held in the measuring device in the output apparatus or not is discriminated. After completion of the discrimination, the processing routine advances to step 407.

In step 407, the process is branched in dependence on a discrimination result in step 406 about the presence or absence of the matching performance of the power saving mode shift time information Timer_Data. If there is the matching performance, step 409 follows. If there is no matching performance, step 408 follows.

Step 408 is a process which is executed if it is determined in step 407 that there is no matching performance in the received power saving mode shift time information Timer_Data. The power saving mode shift time information data area in the output apparatus is not updated but a process to notify the server 12 of the fact that the power saving mode shift time information is not updated is executed. After completion of the transmission, the processing routine advances to step 411.

In step 409, the power saving mode shift time information Timer_Data received from the server 12 is compared with the power saving mode shift time information Timer_Data in the output apparatus. That is, whether the power saving mode shift time information registered in the server 12 has been updated or not is discriminated. If it is determined that the information has been updated, the processing routine advances to step 410. If it is determined that the information is not updated, the processing routine advances to step 411.

In step 410, a process to store the power saving mode shift time information Timer_Data into the power saving mode shift time information data area of the output apparatus is executed. Thus, a process such that if the present time information held in the measuring device in the output apparatus coincides with the power saving mode shift time information Timer_Data, the output apparatus is shifted to the power saving mode is executed. After completion of the storing process, the processing routine advances to step 411.

In step 411, a process to initialize the second timer for measuring the time interval to transmit the power saving mode shift time information obtaining request to the server 12 is executed. After completion of the initialization, the processing routine is returned to step 402, thereby forming a loop. Thus, it will be understood that when the output apparatus is activated, the power saving mode shift time information managed in the server 12 is always asked at predetermined intervals. The time interval to ask the power saving mode shift time information can be set by the user.

The process to update the power saving mode shift time information data built in the server 12 on the side of the client apparatuses 31 to 34 is similar to that in the embodiment 2.

In the embodiment as described above, the power saving mode shift time information of the output apparatuses connected to the network can be concentratedly managed in the server. That is, in the server, the power saving mode shift time information of the output apparatuses connected to the network is concentratedly managed and each output apparatus transmits the power saving mode shift time information data obtaining request to the server. When this data obtaining request is received, the server transmits the power saving mode shift time information as a response to each output apparatus serving as a transmitting source side. The output apparatus which received this response can update the information in the apparatus from the power saving mode shift time information.

Thus, the user does not need to go to each of the output apparatuses connected to the network each time and execute the setting operation of the power saving mode shift time information. The improvement of the use convenience of the user can be expected.

It is possible to avoid a situation such that the user executes the setting operation of the different power saving mode shift time information data to the timers of the output apparatuses or a situation such that the user carelessly forgets to set the power saving mode shift time information data to the timers of the output apparatuses. The improvement of a decrease in electric power consumption can be expected.

Further, by updating the power saving mode shift time information held in the server from the client apparatuses also connected to the network, the power saving mode shift time information held in the server can be updated from an arbitrary client apparatus also connected to the network by the operation of the user. Thus, the improvement of the use convenience of the user can be expected.

Moreover, by inquiring of the server about the power saving mode shift time information at timing when the time measured by the second timer device in the printer has reached a certain time, each output apparatus can ask the power saving mode shift time information held in the server at every time intervals of a certain extent.

In addition, since the time interval for inquiring of the server about the power saving mode shift time information can be arbitrarily set by the user of each printer, the time interval when the output apparatus asks the power saving mode shift time information held in the server can be set by the user. Thus, the reduction of the load on the network can be expected.

Further, the printer inquires of the server about the power saving mode shift time information. When the power saving mode shift time memory information held in the printer is updated as a result of the inquiry, a message showing that the power saving mode shift time memory information has been updated is displayed to the display means. Thus, the users near the output apparatus can be notified of the fact that the power saving mode shift time memory information has been updated.

EMBODIMENT 4

In the embodiment 4, processes which are executed on the output apparatus side when the power saving mode shift time memory information is transmitted from the server 12 in the output apparatuses 21 to 28 are similar to those in the embodiment 2 (refer to FIGS. 6, 12, 13, and 14).

Figure 19:
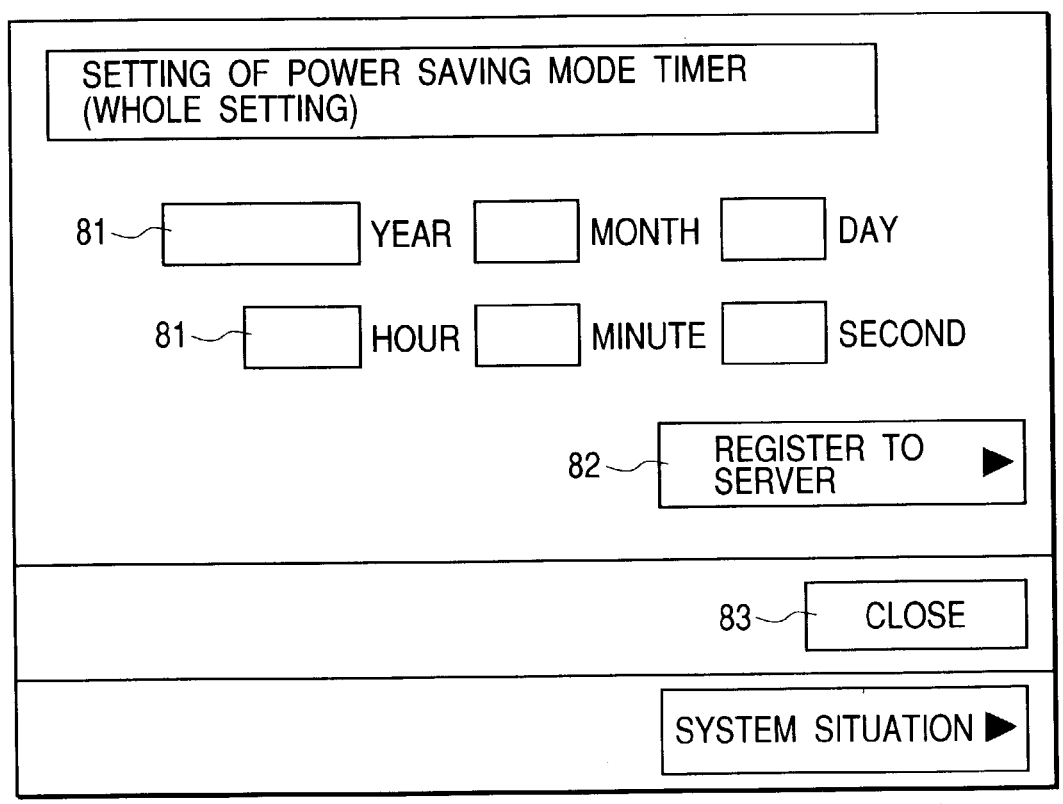
FIG. 19 is a diagram showing an example of an operation display screen for outputting the updating request of the power saving mode shift time information data to the server.

FIG. 19 is a diagram showing an example of the operation display screen in the control unit of the output apparatus for outputting the updating request of the power saving mode shift time information to the server. This display screen is displayed on the display unit 71 of the operation unit 70.

Reference numeral 81 denotes the display box for displaying the power saving mode shift time information data and allowing the user to change it. The display box 81 is divided into boxes of year, month, day, hour, minute, and second and the user executes the inputting operation by the ten-key 73.

Reference numeral 82 denotes the server register button. When the user executes the process for selecting the server register button 82 on the operation unit 70 of the output apparatus, the power saving mode shift time information data displayed in the display box 81 on the operation unit 70 is transmitted to the server 12. When such data is received, the server 12 executes a process for updating the power saving mode shift time information stored in the power saving mode shift time information data area 40 built in the server 12.

When the process to update the power saving mode shift time information is executed in the server 12, it is used as a trigger and a process to transmit the updated power saving mode shift time information to each of the output apparatuses 21 to 28 connected to the network 11 is started.

Reference numeral 83 denotes the operation button to close the operation display screen for issuing the updating request of the power saving mode shift time information to the server.

A specific power saving mode shift time can be also similarly deleted from the server 12 from the operation display screen. When the user executes the deleting process from a certain output apparatus, a process to transmit a deleting request for deleting the power saving mode shift time information data from the power saving mode shift time information data area 40 built in the server 12 to the server 12 is executed.

When the data deleting request is received, the server 12 executes a process to delete the corresponding power saving mode shift time information accumulated in the power saving mode shift time information data area of the printer group to which the output apparatus on a deletion requesting source side built in the server 12 belongs.

Figure 20:
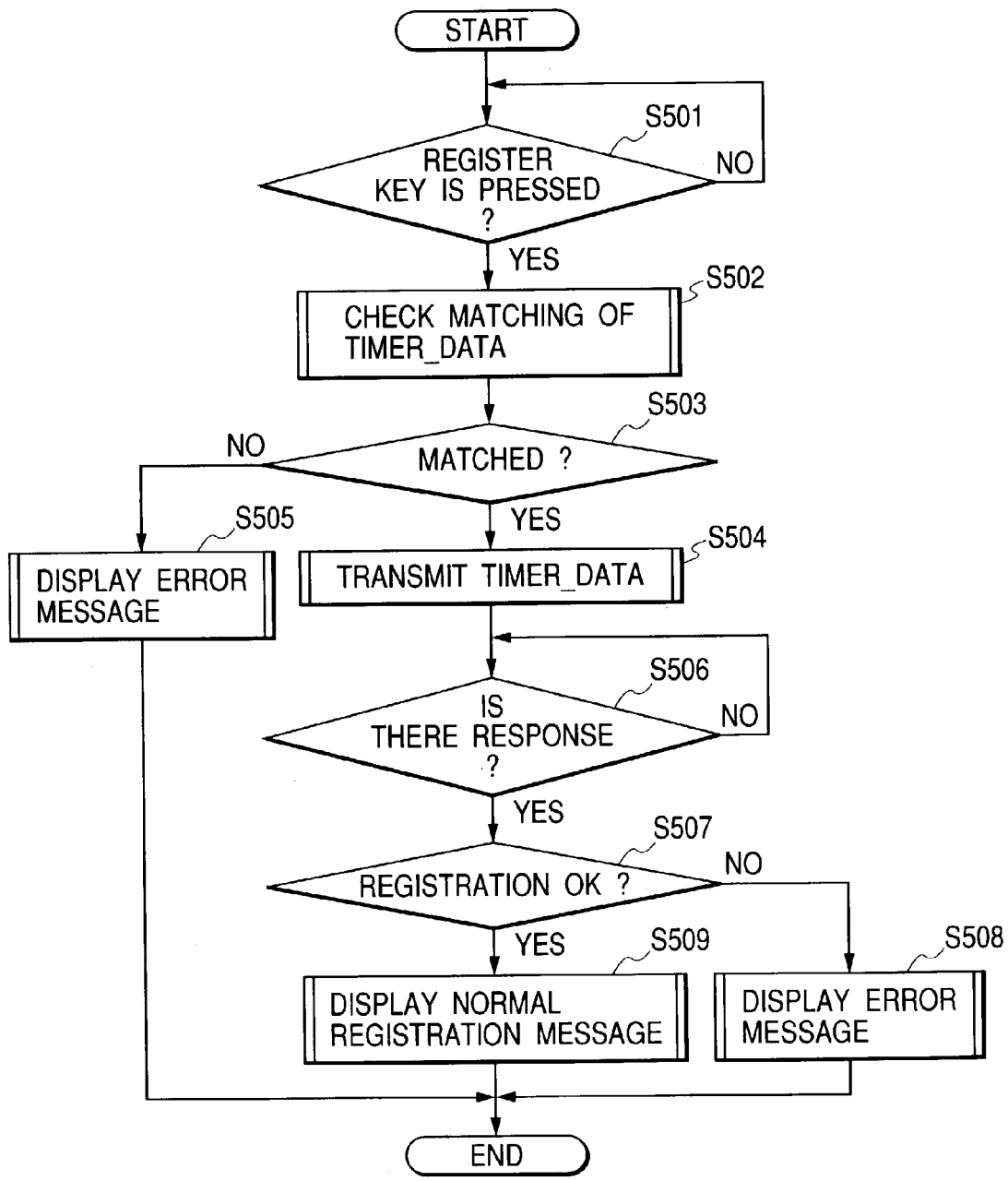
FIG. 20 is a flowchart showing a control flow for the output apparatus in the case where the process to select the server register button 82 is executed by the operation of the user.

FIG. 20 is a flowchart showing a control flow for the output apparatus in the case where the process to select the server register button 82 is executed by the operation of the user on the operation display screen to output the updating request of the power saving mode shift time information to the server shown in FIG. 19.

This processing routine is started at timing when the operation display screen to output the updating request of the power saving mode shift time information to the server is displayed on the operation unit 70. After this processing routine is started, step 501 (in the diagram, each step is shown by "S") follows.

In step 501, whether the operation to select the server register button 82 has been executed or not is discriminated and a loop is formed until the selecting operation is executed. That is, step 501 plays a role of allowing the system to wait for the process until the user selects the server register button 82. If the user selects the server register button 82, the processing routine advances to step 502.

In step 502, a process to call a process for discriminating the matching performance of the power saving mode shift time information Timer_Data is executed. Specifically speaking, whether the time/date of the power saving mode shift time information Timer_Data exists on the actual calendar or not or whether the time/date of the power saving mode shift time information Timer_Data exists in the future from the present time information held in the measuring device built in the output apparatus or not is discriminated. After completion of the discrimination, the processing routine advances to step 503.

In step 503, the process is branched in dependence on a discrimination result in step 502 about the presence or absence of the matching performance of the power saving mode shift time information Timer_Data. If there is the matching performance, step 504 follows. If there is no matching performance, step 505 follows.

In step 504, a process to transmit the power saving mode shift time information Timer_Data to the server 12 is executed. After completion of the transmission, step 506 follows.

In step 505, there is executed a process to display an error message to the display unit 71 of the operation unit 70 in order to notify the user of the fact that the power saving mode shift time information Timer_Data is not transmitted to the server 12 because there is no matching performance in the power saving mode shift time information Timer_Data set by the user. After completion of the displaying process, this processing routine is finished.

In step 506, whether there is a response from the server 12 which received the power saving mode shift time information Timer_Data or not is discriminated and a loop is formed until the response comes. That is, step 506 plays a role of allowing the system to wait for the response from the server 12. If there is the response from the server 12, the processing routine advances to step 507.

In step 507, contents of the response from the server 12 which received the power saving mode shift time information Timer_Data are discriminated, thereby branching the process on the basis of the discrimination result. That is, whether the transmitted power saving mode shift time information Timer_Data has been registered in the server or not is discriminated. If the response has the contents showing that the power saving mode shift time information Timer_Data has been registered in the server 12, the processing routine advances to step 509. If the response has the contents showing that the power saving mode shift time information Timer_Data is not registered in the server 12, the processing routine advances to step 508.

In step 508, a process to display an error message to the display unit 71 of the operation unit 70 in order to notify the user of the fact that the power saving mode shift time information Timer_Data set by the user is not registered in the server 12 is executed. After completion of the displaying process, this processing routine is finished.

In step 509, a process to display a message to the display unit 71 of the operation unit 70 in order to notify the user of the fact that the power saving mode shift time information Timer_Data set by the user has been registered in the server 12 is executed. After completion of the displaying process, this processing routine is finished.

Owing to the construction as mentioned above, the power saving mode shift time information can be updated to the server from a certain output apparatus connected to the network by the operation of the user. That is, in the server, if the power saving mode shift time information of the output apparatuses connected to the network is concentratedly managed and the power saving mode shift time information is set into a certain output apparatus connected to the network, the updating process can be executed to the server from the set output apparatus. The power saving mode shift time information data is transmitted from the server to each of the output apparatuses via the network and the power saving mode shift time information of the output apparatuses can be synchronously updated.

Consequently, the user does not need to go to all of the output apparatuses connected to the network each time and execute the setting operation of the power saving mode shift time information. The improvement of the use convenience of the user can be expected.

It is possible to avoid a situation such that the user executes the setting operation of the different power saving mode shift time information data to the timers of the output apparatuses or a situation such that the user carelessly forgets to set the power saving mode shift time information data to the timers of the output apparatuses. The improvement of a decrease in electric power consumption can be expected.

Further, when the power saving mode shift time information held in the server is updated, by using the updating timing as a trigger and notifying each printer connected to the network of the power saving mode shift time information, simultaneously with the updating of the power saving mode shift time information held in the server, the power saving mode shift time information can be reflected to each output apparatus connected to the network.

In addition, in the server, if the power saving mode shift time information of the output apparatuses connected to the network is concentratedly managed and the power saving mode shift time information is set into a certain output apparatus connected to the network, the updating process is executed to the server from the set output apparatus. Each output apparatus transmits the power saving mode shift time information data obtaining request to the server. When this data obtaining request is received, the server transmits the power saving mode shift time information as a response to each of the output apparatuses serving as a transmitting source side. The output apparatus which received the response can update the information in the apparatus from the power saving mode shift time information.

Consequently, the user does not need to go to each of the output apparatuses connected to the network each time and execute the setting operation of the power saving mode shift time information. The improvement of the use convenience of the user can be expected.

It is possible to avoid a situation such that the user executes the setting operation of the different power saving mode shift time information data to the timers of the output apparatuses or a situation such that the user carelessly forgets to set the power saving mode shift time information data to the timer devices of the output apparatuses. The improvement of a decrease in electric power consumption can be expected.

Further, since the user of each printer can set the time interval when the control apparatus of the printer inquires of the server about the power saving mode shift time information, the user can set the time interval when the output apparatus asks the power saving mode shift time information held in the server. Thus, the reduction of the load on the network can be expected.

Moreover, since the printer has the display apparatus which can be operated in an interactive manner, the request to update the power saving mode shift time information is made to the server by the printer. When the updating of the power saving mode shift time information of the server is normally finished, a message showing the normal updating of the information can be displayed on the display apparatus.

In addition, the request to update the power saving mode shift time information is made to the server by the printer. If the updating of the power saving mode shift time information of the server fails, a message showing the failure in the updating of the information can be displayed on the display apparatus.

Further, the user who set the power saving mode shift time information into the output apparatus can confirm whether the updating process to the server has normally been finished or not on the set output apparatus. The use convenience of the user can be improved.

According to the invention as described above, in the power saving management system having a plurality of output apparatuses with the power saving mode for transmitting the information via the network and the managing apparatus for managing the power saving modes of the plurality of output apparatuses via the network, the whole electric power consumption of the output apparatuses can be effectively reduced.

What is claimed is:

1. A power saving management system having a plurality of output apparatuses with a power saving mode wherein each of said plurality of output apparatuses comprises:
a timer unit adapted to measure a time;
a power saving mode shift time memory unit adapted to store a power saving mode shift time indicative of a time to shift to the power saving mode;
a power saving mode control unit adapted to shift said output apparatus to the power saving mode when the time measured by said timer unit reaches the power saving mode shift time stored by said power saving mode shift time memory unit;
a first updating unit adapted to update the power saving mode shift time stored by said power saving mode shift time memory unit in accordance with a power saving mode shift time notified by another of said plurality of output apparatuses;
a second updating unit adapted to update the power saving mode shift time stored by said power saving mode shift time memory unit in accordance with a user's update operation for updating the power saving mode shift time; and
a notifying unit adapted to notify the other of said plurality of output apparatuses of the power saving mode shift time updated by said second updating unit.

2. A system according to claim 1, wherein said notifying unit notifies said plurality of other output apparatuses of the power saving mode shift time via a network in accordance with the user's update operation.

3. A system according to claim 1, wherein each of said output apparatuses comprises a display unit adapted to display a message showing that the power saving mode shift time has been updated in the case where the power saving mode shift time in said power saving mode shift time memory unit is updated in accordance with the power saving mode shift time notified by said plurality of other output apparatuses.

4. A power saving management system having a plurality of output apparatuses with a power saving mode and a managing apparatus for managing the power saving modes of the plurality of output apparatuses via a network,
wherein said managing apparatus comprises:
a management information memory unit adapted to store a power saving mode shift time indicative of a time to shift to the power saving mode; and
a notifying unit adapted to notify at least one of said plurality of output apparatuses of the power saving mode shift time stored in said management information memory unit via the network,
wherein each of said plurality of output apparatuses comprises:
a timer unit adapted to measure a time;
a power saving mode shift time memory unit adapted to store the power saving mode shift time;
a power saving mode control unit adapted to shift said output apparatus to the power saving mode when the time measured by said timer unit reaches the power saving mode shift time stored by said power saving mode shift time memory unit;
an updating unit adapted to update the power saving mode shift time stored by said power saving mode shift time memory unit in accordance with the power saving mode shift time notified by said notifying unit; and
an inquiry unit adapted to send an inquiry about the power saving mode shift time to said managing apparatus,
wherein said notifying unit notifies said output apparatus of the power saving mode shift time stored in said management information memory unit in response to the inquiry about the power saving mode shift time sent by said inquiry unit, and
wherein said updating unit updates the power saving mode shift time stored by said power saving mode shift time memory unit to the power saving mode shift time notified by said notifying unit, in response to the inquiry send by said inquiry unit.

5. A system according to claim 4, wherein said output apparatus further comprises a second timer unit adapted to measure a time, and
said inquiry unit sends the inquiry about the power saving mode shift time when the time measured by said second timer unit reaches a predetermined time.

6. A power saving management system having a plurality of output apparatuses with a power saving mode and a managing apparatus for managing the power saving modes of the plurality of output apparatuses via a network,
wherein said managing apparatus comprises:
a management information memory unit adapted to store a power saving mode shift time indicative of a time to shift to the power saving mode; and
a notifying unit adapted to notify at least one of said plurality of output apparatuses of the power saving mode shift time stored in said management information memory unit via the network,
wherein each of said plurality of output apparatuses comprises:
a timer unit adapted to measure a time;
a power saving mode shift time memory unit adapted to store the power saving mode shift time;
a power saving mode control unit adapted to shift said output apparatus to the power saving mode when the time measured by said timer unit reaches the power saving mode shift time stored by said power saving mode shift time memory unit; a first updating unit adapted to update the power saving mode shift time stored by said power saving mode shift time memory unit in accordance with the power saving mode shift time notified by said notifying unit;
a setting unit adapted to arbitrarily set the power saving mode shift time stored by said power saving mode shift time memory unit; and
a second notifying unit adapted to, when the power saving mode shift time stored by said power saving mode shift time memory unit is arbitrarily set by said setting unit, notify said managing apparatus of the arbitrarily set power saving mode shift time via the network, and
wherein said managing apparatus further comprises a second updating unit adapted to update the power saving mode shift time stored by said management information memory unit in accordance with the power saving mode shift time notified by said second notifying unit.

7. A system according to claim 6, wherein when said first updating unit receives a response indicative of success or failure of the updating of the power saving mode shift time from said managing apparatus which received the power saving mode shift time notified by said second notifying unit, a message indicative of the success or failure of the updating of the power saving mode shift time by said managing apparatus is displayed on a display apparatus.

8. An output apparatus which has a power saving mode and can communicate with another output apparatus, comprising:

a first power saving mode shift time memory unit adapted to store a power saving mode shift time indicative of a time to shift to the power saving mode;

a first updating unit adapted to update the power saving mode shift time stored by said first power saving mode shift time memory unit, in accordance with a user's update operation for updating the power saving mode shift time; and a notifying unit adapted to notify said other output apparatus of the power saving mode shift time updated by said first updating unit, wherein said other output apparatus shifts to the power saving mode when a time measured by a timer reaches the power saving mode shift time notified by said notifying unit.

9. An apparatus according to claim 8, wherein said output apparatus can communicate with a plurality of other output apparatuses, and said notifying unit notifies said plurality of other output apparatuses of the updated power saving mode shift time via a network.

10. An apparatus according to claim 9, further comprising:

a counting unit adapted to count, based on a response from each of said plurality of other output apparatuses indicating whether or not the power saving mode shift time is updated, the number of output apparatuses in which the power saving mode shift time is updated and the number of output apparatuses in which the power saving mode shift time is not updated; and a display unit adapted to display the numbers counted by said counting unit.

11. An apparatus according to claim 8, further comprising a display unit adapted to display, based on a response from said other output apparatus indicating whether or not the power saving mode shift time is updated, a message showing whether or not the power saving mode shift time in said other output apparatus is updated, in accordance with the power saving mode shift time notified by said notifying unit.

12. A power saving managing method executed by a plurality of output apparatuses which are shifted to a power saving mode when a time measured by a timer reaches a power saving mode shift time and by a managing apparatus for managing the power saving modes of the plurality of output apparatuses via a network, comprising the steps of:

sending an inquiry about the power saving mode shift time from at least one of the plurality of output apparatuses to the managing apparatus via the network;

notifying the at least one output apparatus of the power saving mode shift time from the managing apparatus via the network, in response to the inquiry sent in said sending step; and in the at least one output apparatus, updating the power saving mode shift time in accordance with the power saving mode shift time notified in said notifying step.

13. A power saving managing method executed by a plurality of output apparatuses which are shifted to a power saving mode when a time measured by a timer reaches a power saving mode shift time and by a managing apparatus for managing the power saving modes of the plurality of output apparatuses via a network, comprising:

a first notifying step of notifying at least one of the plurality of output apparatuses of the power saving mode shift time from the managing apparatus via the network; and a first updating step of, in the at least one output apparatus, updating the power saving mode shift time in accordance with the power saving mode shift time notified in said first notifying step, a second notifying step of, when the power saving mode shift time is arbitrarily set in the at least one output apparatus, notifying the managing apparatus of the arbitrarily set power saving mode shift time from the at least one output apparatus via said the network; and a second updating step of, in the managing apparatus, updating the power saving mode shift time in accordance with the power saving mode shift time notified in said second notifying step.

14. A power saving managing method executed by an output apparatus which has a power saving mode and can communicate with another output apparatus, comprising the steps of:

in the output apparatus, updating a power saving mode shift time indicative of a time to shift to the power saving mode, in accordance with a user's update operation for updating the power saving mode shift time; and notifying the other output apparatus of the updated power saving mode shift times, wherein the other output apparatus updates the power saving mode shift time in accordance with the power saving mode shift time notified in said notifying step.

* * * * *

UNITED STATES PATENT AND TRADEMARK OFFICE
CERTIFICATE OF CORRECTION

PATENT NO. : 7,076,673 B2
APPLICATION NO. : 10/368669
DATED : July 11, 2006
INVENTOR(S) : Tomoyasu Yoshikawa It is certified that error appears in the above-identified patent and that said Letters Patent is hereby corrected as shown below:

COLUMN 7:
Line 41, "the," should read -- the --.

COLUMN 8:
Line 15, "transmits" should read -- transmit --.

COLUMN 10:
Delete lines 26-28.

COLUMN 11:
Line 8, "functions, the" should read -- functions. The --; and
Line 28, "sensor" should read -- server --.

COLUMN 14:
Line 56, "here" should read -- here and --.

COLUMN 17:
Line 52, "button:" should read -- button. --.

COLUMN 22:
Line 10, "send" should read -- sent --; and
Line 38, "unit;" should read -- unit; ¶ --.

UNITED STATES PATENT AND TRADEMARK OFFICE
CERTIFICATE OF CORRECTION

PATENT NO. : 7,076,673 B2
APPLICATION NO. : 10/368669
DATED : July 11, 2006
INVENTOR(S) : Tomoyasu Yoshikawa It is certified that error appears in the above-identified patent and that said Letters Patent is hereby corrected as shown below:

COLUMN 24:
Line 26, delete "said"; and
Line 41, "times," should read -- time, --.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,076,673 B2
APPLICATION NO. : 10/368669
DATED : July 11, 2006
INVENTOR(S) : Tomoyasu Yoshikawa It is certified that error appears in the above-identified patent and that said Letters Patent is hereby corrected as shown below:

COLUMN 7:
Line 41, "the," should read -- the --.

COLUMN 8:
Line 15, "transmits" should read -- transmit --.

COLUMN 10:
Delete lines 26-28.

COLUMN 11:
Line 8, "functions, the" should read -- functions. The --; and
Line 28, "sensor" should read -- server --.

COLUMN 14:
Line 56, "here" should read -- here and --.

COLUMN 17:
Line 52, "button:" should read -- button. --.

COLUMN 22:
Line 10, "send" should read -- sent --; and
Line 38, "unit;" should read -- unit; ¶ --.

UNITED STATES PATENT AND TRADEMARK OFFICE
CERTIFICATE OF CORRECTION

PATENT NO. : 7,076,673 B2
APPLICATION NO. : 10/368669
DATED : July 11, 2006
INVENTOR(S) : Tomoyasu Yoshikawa It is certified that error appears in the above-identified patent and that said Letters Patent is hereby corrected as shown below:

COLUMN 24:
Line 26, delete "said"; and
Line 41, "times," should read -- time, --.

Signed and Sealed this

Twenty-ninth Day of December, 2009

David J. Kappos
*Director of the United States Patent and Trademark Office*